(12) United States Patent
Haruta et al.

(10) Patent No.: US 8,728,594 B2
(45) Date of Patent: *May 20, 2014

(54) HEAT-SHRINKABLE WHITE POLYESTER FILM, PROCESS FOR PRODUCING HEAT-SHRINKABLE WHITE POLYESTER FILM, LABEL, AND PACKAGE

(75) Inventors: Masayuki Haruta, Inuyama (JP); Masatoshi Hashimoto, Inuyama (JP); Yukinobu Mukoyama, Otsu (JP); Katsuhiko Nose, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 168 days.

This patent is subject to a terminal disclaimer.

(21) Appl. No.: 12/919,920

(22) PCT Filed: Feb. 24, 2009

(86) PCT No.: PCT/JP2009/053234
§ 371 (c)(1),
(2), (4) Date: Aug. 27, 2010

(87) PCT Pub. No.: WO2009/107591
PCT Pub. Date: Sep. 3, 2009

(65) Prior Publication Data
US 2011/0008607 A1    Jan. 13, 2011

(30) Foreign Application Priority Data

Feb. 27, 2008 (JP) ................. 2008-045890
Feb. 27, 2008 (JP) ................. 2008-045891
Feb. 27, 2008 (JP) ................. 2008-045892
Feb. 17, 2009 (JP) ................. 2009-033484
Feb. 17, 2009 (JP) ................. 2009-033485
Feb. 17, 2009 (JP) ................. 2009-033486

(51) Int. Cl.
*B32B 1/08*  (2006.01)
*B32B 27/06*  (2006.01)
*B32B 27/08*  (2006.01)
*B32B 27/36*  (2006.01)
*B32B 3/00*  (2006.01)
*B32B 3/26*  (2006.01)

(52) U.S. Cl.
USPC ....... 428/35.2; 428/34.1; 428/34.9; 428/35.1; 428/35.5; 428/35.7; 428/304.4; 428/315.5; 428/480; 428/914

(58) Field of Classification Search
None
See application file for complete search history.

(56) References Cited

U.S. PATENT DOCUMENTS 4,059,667 A    11/1977  Pangonis
4,582,752 A *   4/1986  Duncan ................. 428/317.9
(Continued)

FOREIGN PATENT DOCUMENTS

CN    1438109 A       8/2003
EP    1 264 680 B1   12/2002
(Continued)

OTHER PUBLICATIONS

European Patent Office, Extended European Search Report in European Patent Application No. 09714855 (Mar. 26, 2012).
(Continued)

*Primary Examiner* — Vivian Chen
(74) *Attorney, Agent, or Firm* — Leydig, Voit & Mayer, Ltd.

(57) ABSTRACT

A heat-shrinkable white polyester film is provided which has extremely satisfactory cuttability along a perforation and has light-shielding properties. Also provided are: a label; and a process for producing the film with high productivity. The heat-shrinkable white polyester film comprises a polyester resin constituted of ethylene terephthalate as a main constituent component and containing at least 13 mol % one or more monomer ingredients capable of serving as an amorphous component among all components of the polyester resin. This film has specific heat shrinkability, specific light-shielding properties, and specific mechanical properties. The process is excellent in the productivity of the film. The label is obtained from the heat-shrinkable white polyester film.

5 Claims, 1 Drawing Sheet

(56) References Cited

U.S. PATENT DOCUMENTS

| | | | |
|---|---|---|---|
| 4,939,232 A | 7/1990 | Fukuda et al. | |
| 4,963,418 A | 10/1990 | Isaka et al. | |
| 4,996,291 A * | 2/1991 | Yoshinaka et al. | 528/272 |
| 5,407,752 A | 4/1995 | Fukuzumi et al. | |
| 5,985,387 A | 11/1999 | Mori et al. | |
| 6,090,898 A * | 7/2000 | Tsunekawa et al. | 525/444 |
| 6,231,958 B1 * | 5/2001 | Kim et al. | 528/272 |
| 6,270,866 B1 | 8/2001 | Okuda et al. | |
| 6,342,281 B2 | 1/2002 | Hayakawa et al. | |
| 6,383,627 B2 * | 5/2002 | Hashimoto et al. | 428/332 |
| 6,413,596 B1 | 7/2002 | Okuda et al. | |
| 6,447,925 B1 | 9/2002 | Tabota et al. | |
| 6,524,669 B2 * | 2/2003 | Ito et al. | 428/34.9 |
| 6,623,821 B1 * | 9/2003 | Kendig | 428/34.9 |
| 6,720,085 B2 * | 4/2004 | Ito et al. | 428/480 |
| 6,761,966 B2 | 7/2004 | Ito et al. | |
| 6,939,616 B2 | 9/2005 | Hayakawa et al. | |
| 6,958,178 B2 * | 10/2005 | Hayakawa et al. | 428/34.9 |
| 7,001,651 B2 * | 2/2006 | Hayakawa et al. | 428/34.9 |
| 7,008,698 B2 | 3/2006 | Marlow et al. | |
| 7,279,204 B2 | 10/2007 | Ito et al. | |
| 7,303,812 B2 * | 12/2007 | Hashimoto et al. | 428/318.6 |
| 7,306,835 B2 * | 12/2007 | Hong et al. | 428/35.1 |
| 7,344,765 B2 * | 3/2008 | Hayakawa et al. | 428/34.9 |
| 7,829,655 B2 * | 11/2010 | Endo et al. | 528/308.1 |
| 7,960,028 B2 * | 6/2011 | Inagaki et al. | 428/423.7 |
| 7,980,407 B2 * | 7/2011 | Shimada | 220/62.22 |
| 8,206,797 B2 * | 6/2012 | Haruta et al. | 428/35.1 |
| 8,232,351 B2 * | 7/2012 | Mukoyama et al. | 525/222 |
| 2001/0014729 A1 | 8/2001 | Hayakawa et al. | |
| 2002/0090502 A1 | 7/2002 | Ito et al. | |
| 2003/0050430 A1 | 3/2003 | Ito et al. | |
| 2003/0165658 A1 | 9/2003 | Hayakawa et al. | |
| 2003/0165671 A1 * | 9/2003 | Hashimoto et al. | 428/304.4 |
| 2003/0170427 A1 * | 9/2003 | Ito et al. | 428/156 |
| 2005/0196563 A1 | 9/2005 | Ito et al. | |
| 2005/0236731 A1 | 10/2005 | Hayakawa et al. | |
| 2006/0057346 A1 | 3/2006 | Ito et al. | |
| 2007/0104931 A1 | 5/2007 | Ito et al. | |
| 2009/0270584 A1 | 10/2009 | Endo et al. | |
| 2009/0304997 A1 * | 12/2009 | Haruta et al. | 428/156 |
| 2010/0093965 A1 * | 4/2010 | Yamamoto et al. | 526/348.1 |
| 2010/0100363 A1 * | 4/2010 | Kurnik | 703/2 |
| 2010/0247845 A1 * | 9/2010 | Haruta et al. | 428/98 |
| 2010/0260951 A1 | 10/2010 | Haruta et al. | |
| 2011/0008607 A1 | 1/2011 | Haruta et al. | |
| 2012/0043248 A1 * | 2/2012 | Haruta et al. | 206/497 |

FOREIGN PATENT DOCUMENTS

| | | |
|---|---|---|
| EP | 1 340 609 A2 | 9/2003 |
| EP | 2058357 A1 | 5/2009 |
| EP | 2208609 A1 | 7/2010 |
| JP | 63-236623 A | 10/1988 |
| JP | 05-254015 A | 10/1993 |
| JP | 08-244114 A | 9/1996 |
| JP | 09-001751 A | 1/1997 |
| JP | 2000-254968 A | 9/2000 |
| JP | 2001-288283 A | 10/2001 |
| JP | 2002-120343 A | 4/2002 |
| JP | 2002-363312 A | 12/2002 |
| JP | 2003-170498 A | 6/2003 |
| JP | 2003-236930 A | 8/2003 |
| JP | 2003-326658 * | 11/2003 |
| JP | 2003-326658 A | 11/2003 |
| JP | 2004-34451 A | 2/2004 |
| JP | 2004-351734 A | 12/2004 |
| JP | 2005-066933 A | 3/2005 |
| JP | 2005-194466 A | 7/2005 |
| JP | 2006-45317 A | 2/2006 |
| JP | 2006-181899 A | 7/2006 |
| JP | 2006-212926 A | 8/2006 |
| JP | 2006-233092 A | 9/2006 |
| JP | 2007-016120 A | 1/2007 |
| JP | 2007-056156 A | 3/2007 |
| JP | 2007-152943 A | 6/2007 |
| JP | 2008-274160 A | 11/2008 |
| KR | 10-0538200 B1 | 12/2005 |
| WO | WO 2005/012403 A1 | 2/2005 |
| WO | WO 2007/145231 A1 | 12/2007 |
| WO | WO 2008/018528 A1 | 2/2008 |
| WO | WO 2008/026530 A1 | 3/2008 |
| WO | WO 2008/026530 * | 6/2008 |

OTHER PUBLICATIONS

Mukoyama, Yokinobu, of Tsuruga Center, Toyobo Co., Ltd., "Experiment Report" (Jun. 30, 2010) [with respect to Office Action dated Apr. 8, 2010 in Japanese Patent Application No. 2007-215454].

European Patent Office, Extended European Search Report in European Patent Application No. 08833952.8 (Feb. 2, 2012).

European Patent Office, Extended European Search Report in European Patent Application No. 07793001 (Sep. 15, 2012).

Japanese Patent Office, International Search Report in International Patent Application No. PCT/JP2007/066524 (Oct. 9, 2007).

Japanese Patent Office, International Written Opinion in International Patent Application No. PCT/JP2007/066524 (Oct. 9, 2007).

Japanese Patent Office, International Search Report in International Patent Application No. PCT/JP2008/067144 (Dec. 16, 2008).

Japanese Patent Office, Written Opinion in International Patent Application No. PCT/JP2008/067144 (Dec. 16, 2008).

Japanese Patent Office, International Search Report in International Patent Application No. PCT/JP2009/053234 (Jun. 2, 2009).

Japanese Patent Office, International Written Opinion in International Patent Application No. PCT/JP2009/053234 (Jun. 2, 2009).

Japanese Patent Office, Notice of Reasons for Rejection in Japanese Patent Application No. JP 2007-246701 (Apr. 13, 2010).

Japanese Patent Office, Notice of Reasons for Rejection in Japanese Patent Application No. JP2007-215454 (Apr. 2, 2010).

Japanese Patent Office, Notice of Reasons for Rejection in Japanese Patent Application No. JP2007-215454 (Oct. 12, 2010).

Japanese Patent Office, Notice of Reasons for Rejection in Japanese Patent Application No. 2007-215454 (Jan. 25, 2011).

Japanese Patent Office, International Search Report in International Patent Application No. PCT/JP2008/072476 (Mar. 3, 2009).

European Patent Office, Extended European Search Report in European Patent Application No. 08860074.7 (Jan. 6, 2012).

Japanese Patent Office, Notification of Reasons for Refusal in Japanese Patent Application No. 2008-047442 (Feb. 28, 2012).

Chinese Patent Office, First Office Action in Chinese Patent Application No. 200880120189.0 (Mar. 12, 2012).

European Patent Office, Communication Pursuant to Article 94(3) EPC in European Patent Application No. 08 833 952.8 (Jan. 29, 2013).

European Patent Office, Supplementary European Search Report in European Patent Application No. 07745143 (Nov. 20, 2009).

International Bureau of WIPO, International Preliminary Report on Patentability in International Patent Application No. PCT/JP2007/061860 (Dec. 16, 2008).

Japanese Patent Office, International Search Report in International Patent Application No. PCT/JP2007/061860 (Sep. 4, 2007).

Korean Patent Office, Notice Requesting Submission of Opinion in Korean Application No. 10-2009-700609 (Jul. 8, 2010).

Chinese Patent Office, Office Action in Chinese Patent Application No. 200980104750.0 (Nov. 29, 2012).

Japanese Patent Office, Notice of Reasons for Rejection in Japanese Patent Application No. 2009-033485 (Jun. 25, 2013).

Japanese Patent Office, Notice of Reasons for Rejection in Japanese Patent Application No. 2009-033484 (Jul. 23, 2013).

Japanese Patent Office, Notice of Reasons for Rejection in Japanese Patent Application No. 2009-033486 (Jul. 23, 2013).

* cited by examiner

HEAT-SHRINKABLE WHITE POLYESTER FILM, PROCESS FOR PRODUCING HEAT-SHRINKABLE WHITE POLYESTER FILM, LABEL, AND PACKAGE

TECHNICAL FIELD

The present invention relates to a heat-shrinkable white polyester film, a method for producing the same, a label and a package, specifically it relates to a heat-shrinkable white polyester film having a light shielding property and being suitable for label applications, a method for producing the same, a label having a light shielding property and being good in a tearing property, and a package using the label.

BACKGROUND ART

Recently, in applications such as label package doubling as a protection of a glass bottle and a PET bottle etc. and display of articles, cap sealing and accumulation package, there have been widely used drawn films (so-called heat-shrinkable films) composed of a polyvinyl chloride resin, a polystyrene resin, a polyester resin or the like. Of these heat-shrinkable films, a polyvinyl chloride film has problems that heat resistance is low, and it generates hydrogen chloride gas in incineration and causes dioxin. A polystyrene film has problems that it is inferior in chemical resistance, as well as an ink with a special composition needs to be used in printing, it requires high temperature incineration and generates a lot of black smoke accompanied by an abnormal odor. Therefore, as a shrink label, there has been widely used a polyester-based heat-shrinkable film which is high in heat resistance, easy to incinerate, and excellent in chemical resistance, and the use amount tends to increase being accompanied by an increase in turn volume of PET containers.

Further, as a heat-shrinkable film, a film is generally utilized which greatly shrinks in the width direction in terms of handleability in label production. Hence, the conventional heat-shrinkable polyester film has been produced by drawing at a high ratio in the width direction in order to exhibit a sufficient shrinkage force in the width direction at heating.

However, regarding the conventional heat-shrinkable polyester film, since almost no drawing is carried out in the longitudinal direction orthogonal to the main shrinkage direction, the mechanical strength is low, in the case where it is shrunk and covered on a PET bottle or the like as a label, there is a defect that a label cannot be torn well along perforations (namely, poor perforation-tear property). Further, when a film is drawn in the longitudinal direction in production in order to improve perforation-tear property of the heat-shrinkable polyester film, the mechanical strength becomes high, and perforation-tear property are improved to some extent, however, shrinkage force is exhibited in the longitudinal direction, thus when it is shrunk and covered on a PET bottle or the like as a label, a defect in which visual quality (shrinkage finish properties) becomes very bad is exposed. Since the conventional heat-shrinkable polyester film is hardly drawn in the longitudinal direction orthogonal to the main shrinkage direction, there is a problem that the mechanical strength thereof is low and the film tends to split in the longitudinal direction in processing such as printing, and there is a problem that film stiffness is insufficient in high-speed attachment when a film is attached on a bottle or the like.

Therefore, in order to improve perforation-tear property of the heat-shrinkable polyester film, a method in which an incompatible thermoplastic resin is mixed in the main raw material of the heat-shrinkable polyester film is proposed (Patent document 1).

Patent document 1: Japanese Unexamined Patent Publication No. 2002-363312

DISCLOSURE OF THE INVENTION

Problem to be Solved by the Invention

According to the method in which an incompatible thermoplastic resin is mixed in the main raw material of the heat-shrinkable polyester film like the above-described Patent document 1, although the perforation-tear property of the heat-shrinkable polyester film are improved to some extent, it cannot be necessarily said to obtain a heat-shrinkable polyester film with sufficient perforation-tear property. Further, even in the case of adopting a method like the Patent document 1, since drawing can be carried out only in the width direction in production, it is not possible to produce a heat-shrinkable polyester film efficiently.

An object of the present invention is to solve the problems of the conventional heat-shrinkable polyester film, to obtain a heat-shrinkable polyester film which is extremely satisfactory in openability along a perforation, has exceedingly high productivity and hardly split in the longitudinal direction in processing such as printing, and to provide a label which includes such a heat-shrinkable film and is satisfactorily tearable.

Another object of the present invention is to provide a lightweight heat-shrinkable white polyester film having a light shielding property without being printed or processed, and having an excellent appearance when printed.

Further, an object of the present invention is to provide a label having a good tearing property and composed of such a heat-shrinkable white polyester film by obtaining a heat-shrinkable white polyester film very good in perforation-opening, very high in productivity and hardly breakable in the longitudinal direction upon processing such as printing while solving the above-described problems that the conventional heat-shrinkable polyester films have.

Other object of the present invention is to provide a label made of a lightweight heat-shrinkable white polyester film with a light shielding property without being printed or processed, and with an excellent appearance when printed.

Means for Solving the Problem

The present inventions consist of the following constitutions.

1. A heat-shrinkable white polyester film comprising a polyester resin composed of ethylene terephthalate as a main constituent and containing 15% by mole or more of at least one monomer component capable of forming an amorphous component in the whole polyester resin component, wherein the following requirements (1) to (5) are satisfied:

(1) hot-water heat shrinkage in the width direction is 40% or more and 80% or less when being treated in hot water at 90° C. for 10 seconds;

(2) hot-water heat shrinkage in the longitudinal direction is 0% or more and 15% or less when being treated in hot water at 90° C. for 10 seconds;

(3) right-angled tearing strength per unit thickness in the longitudinal direction is 90 N/mm or more and 200 N/mm or less after being shrunk by 10% in the width direction in hot water at 80° C.;

(4) tensile breaking strength in the longitudinal direction is 100 MPa or more and 250 MPa or less; and (5) whiteness is 70 or less, or/and voids are contained.

2. The heat-shrinkable white polyester film of as referred in 1, wherein shrinkage stress in the width direction is 3 MPa or more and 15 MPa or less when heated at 90° C.

3. The heat-shrinkable white polyester film of as referred in 1 or 2, wherein irregularity of thickness in the width direction is 1.0% or more and 12.0% or less.

4. The heat-shrinkable white polyester film of any one of 1 to 3, wherein irregularity of thickness in the longitudinal direction is 1.0% or more and 12.0% or less.

5. The heat-shrinkable white polyester film of any one of 1 to 4, wherein solvent adhesive strength is 2 N/15 mm width or more and 15 N/15 mm width or less.

6. The heat-shrinkable white polyester film of any one of 1 to 5, wherein dynamic friction coefficient is 0.1 or more and 0.55 or less.

7. The heat-shrinkable white polyester film of any one of 1 to 6, wherein a major component of the at least one monomer capable of forming the amorphous component in the whole polyester resin components is any one of neopentyl glycol, 1,4-cyclohexanedimethanol and isophthalic acid.

8. The heat-shrinkable white polyester film of any one of 1 to 7, wherein an apparent density is 1.2 g/cm$^3$ or less.

9. A process for continuously producing of the heat-shrinkable white polyester film of any one of 1 to 8 comprising the following steps (a) to (f):

(a) a lengthwise drawing step for drawing an undrawn film 2.2 times or more and 3.0 times or less in the longitudinal direction at a temperature of Tg or more and Tg+30° C. or less followed by drawing 1.2 times or more and 1.5 times or less in the longitudinal direction at a temperature of Tg+10° C. or more and Tg+40° C. or less, thereby to be drawn lengthwisely 2.8 times or more and 4.5 times or less in total;

(b) an intermediate heat-treatment step for heat-treating the film after the lengthwise drawing at a temperature of 130° C. or more and 190° C. or less for 1.0 second or more and 9.0 seconds or less in a state that both edges in the width direction are held by clips in a tenter;

(c) a natural cooling step for naturally cooling the film after the intermediate heat-treatment by passing through an intermediate zone separated from the front and the rear zones being not provided with an active heating operation;

(d) an active cooling step for actively cooling the film after the natural cooling to 80° C. or more and 120° C. or less at a surface temperature;

(e) a transverse drawing step for drawing a film after the active cooling 2.0 times or more and 6.0 times or less in the width direction at a temperature of Tg+10° C. or more and Tg+40° C. or less; and (f) a final heat-treatment step for heat-treating a film after the transverse drawing, at a temperature of 80° C. or more and 100° C. or less for 1.0 second or more and 9.0 seconds or less in a state that both edges in the width direction are held by clips in a tenter.

10. A package wherein the heat-shrinkable white polyester film of any one of 1 to 8 is used as a base material, and a label provided with perforations or a pair of notch is coated on at least a part of the outer circumference and heat-shrunk.

11. A heat-shrinkable white polyester film comprising a polyester resin composed of ethylene terephthalate as a main constituent and containing 13% by mole or more of at least one monomer component capable of forming an amorphous component in the whole polyester resin component, wherein the following requirements (1) to (4) are satisfied:

(1) hot-water heat shrinkage in the longitudinal direction is −2% or more and 4% or less when being treated in hot water at 80° C. for 10 seconds;

(2) hot-water heat shrinkage in the width direction is 50% or more and 80% or less when being treated in hot water at 95° C. for 10 seconds;

(3) right-angled tearing strength per unit thickness in the longitudinal direction is 200 N/mm or more and 300 N/mm or less after being shrunk by 10% in the width direction in hot water at 80° C.; and (4) whiteness is 70 or less, or/and voids are contained.

12. The heat-shrinkable white polyester film of as referred in 11, wherein solvent adhesive strength is 2 N/15 mm width or more and 10 N/15 mm width or less.

13. The heat-shrinkable white polyester film of any one of as referred in 11 or 12, wherein irregularity of thickness in the longitudinal direction is 1% or more and 18% or less.

14. The heat-shrinkable white polyester film of any one of 11 to 13, wherein irregularity of thickness in the width direction is 1% or more and 18% or less.

15. The heat-shrinkable white polyester film of any one of 11 to 14, wherein thickness of the film is 20 μm or more and 80 μm or less.

16. The heat-shrinkable white polyester film of any one of 11 to 15, wherein a major component of the at least one monomer capable of forming the amorphous component in the whole polyester resin components is any one of neopentyl glycol, 1,4-cyclohexanedimethanol and isophthalic acid.

17. The heat-shrinkable white polyester film of any one of 11 to 16, wherein an apparent density is 1.2 g/cm$^3$ or less.

18. A package wherein the heat-shrinkable white polyester film of any one of 11 to 17 is used as a base material, and a label provided with perforations or a pair of notch is coated on at least a part of the outer circumference and heat-shrunk.

19. A process for continuously producing of the heat-shrinkable white polyester film of any one of 11 to 17, comprising the following steps (a) to (e):

(a) a lengthwise drawing step for drawing an undrawn film 1.1 times or more and 1.8 times or less in the longitudinal direction at a temperature of 75° C. or more and 100° C. or less;

(b) an intermediate heat-treatment step for heat-treating the film after the lengthwise drawing at a temperature of 110° C. or more and 150° C. or less for 5 seconds or more and 30 seconds or less in a state that both edges in the width direction are held by clips in a tenter;

(c) an active cooling step for actively cooling the film after the intermediate heat-treatment to 70° C. or more and 90° C. or less at a surface temperature;

(d) a transverse drawing step for drawing a film after the active cooling 3.5 times or more and 5.0 times or less in the width direction at a temperature of 65° C. or more and 90° C. or less; and (e) a final heat-treatment step for heat-treating a film after the transverse drawing, at a temperature of 80° C. or more and 100° C. or less for 5 seconds or more and 30 seconds or less in a state that both edges in the width direction are held by clips in a tenter.

20. A label comprising a heat-shrinkable white film as a base material thermally shrinking in the film width direction as the main shrinkage direction, being cut according to an object to be packaged, and bonded at both edges in the film width direction, the tubular body being thermally shrunk so that at least part of the periphery of the object to be packaged is covered with the label, wherein whiteness is 70 or more, or/and voids are contained, a right-angle tear strength in the direction orthogonal to the main shrinkage direction (film longitudinal direction) is 90 N/mm to 300 N/mm, and a tensile break strength in the direction orthogonal to the main shrinkage direction (film longitudinal direction) is 50 MPa or more and 250 MPa or less.

21. The label of as referred in 20, wherein bonding is conducted with an organic solvent.

22. The label of as referred in 20 or 21, wherein a perforation or a notch is provided along the direction orthogonal to the main shrinkage direction (film longitudinal direction).

23. The label of any one of 20 to 22, wherein the heat-shrinkable white film is a heat-shrinkable white polyester film.

24. The label of any one of 20 to 23, wherein an apparent density is 1.20 g/cm$^3$ or less.

Effect of the Invention

In regard to a heat-shrinkable white film of the present invention, shrinkability in the film width direction being the main shrinkage direction is high, mechanical strength in the film longitudinal direction orthogonal to the main shrinkage direction is also high, and also perforation-tear property as a label are good, so that it is possible to cut it cleanly along perforations from the start of tear in tearing until the completion of tear. Further, stiffness (so-called "bend" strength) is high, and attachability as a label is excellent. In addition, processabilities in printing and tubing are excellent. Therefore, the heat-shrinkable white polyester film of the present invention can be suitably used as labels for containers such as bottles, and when used as labels, it can be attached very efficiently on containers such as bottles within a short time, and when heat-shrunk after attachment, it can exhibit good finish property almost free from wrinkle or lack of shrinkage, and the label attached exhibits very good perforation-tear property. The package of the present invention shows a good tear property of a coated label, so that it is possible to tear the coated label cleanly along perforations by a suitable force.

The heat-shrinkable white polyester film of the present invention is lightweight and excellent in appearance, has a light shielding property without being printed or processed, and has an excellent appearance when printed.

In addition, the heat-shrinkable white polyester film of the present invention is produced by biaxial drawing lengthwisely and transversely, thus it can be produced very efficiently.

The label of the present invention is lightweight and excellent in appearance, has a light shielding property without being printed or processed, and has an excellent appearance when printed.

BEST MODE FOR CARRYING OUT THE INVENTION

The polyester used in the present invention is a polyester whose main constituent is ethylene terephthalate. Namely, it contains 50% by mole or more, preferably 60% by mole or more of ethylene terephthalate. Dicarboxylic acid components constituent the polyester of the present invention can include aromatic dicarboxylic acids such as isophthalic acid, naphthalenedicarboxylic acid and ortho-phthalic acid; aliphatic dicarboxylic acids such as adipic acid, azelaic acid, sebacic acid and decanedicarboxylic acid; and alicyclic dicarboxylic acid.

In the case of containing the aliphatic dicarboxylic acids (for example, adipic acid, sebacic acid and decanedicarboxylic acid etc.), the content is preferably less than 3% by mole. A heat-shrinkable white polyester film obtained by using a polyester that contains 3% by mole or more of these aliphatic dicarboxylic acids is insufficient in film stiffness at high-speed attachment.

Further, it is preferable not to contain polybasic carboxylic acids of tribasic or more (for example, trimellitic acid, pyromellitic acid and anhydride thereof etc.). A heat-shrinkable polyester film obtained by using a polyester containing these polybasic carboxylic acids is hard to achieve a necessary high shrinkage ratio.

Diol components constitute the polyester used in the present invention include aliphatic diols such as ethylene glycol, 1,3-propanediol, 1,4-butanediol, neopentyl glycol and hexanediol; alicyclic diols such as 1,4-cyclohexanedimethanol; and aromatic diols such as bisphenol A.

The polyester used in the heat-shrinkable white polyester film of the present invention is preferably a polyester containing one kind or more of cyclic diols such as 1,4-cyclohexanedimethanol and diols having carbon 3 to 6 carbon atoms (for example, 1,3-propanediol, 1,4-butanediol, neopentyl glycol and hexanediol etc.) and adjusting a glass transition point (Tg) in 60 to 80° C.

Further, the polyester used for the heat-shrinkable white polyester film of the present invention preferably has 13% by mole or more of the sum of at least one monomer capable of forming an amorphous component in 100% by mole of the polyhydric alcohol component or in 100% by mole of the polybasic carboxylic acid component in the whole polyester resin, more preferably 15% by mole or more, furthermore preferably 17% by mole or more, and particularly preferably 20% by mole or more. Here, as a monomer capable of forming an amorphous component, for example, there can be listed neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol and hexanediol, and among these, neopentyl glycol, 1,4-cyclohexanedimethanol or isophthalic acid is preferably used. When the total amount of the monomer capable of forming an amorphous component is too large, the heat-shrinkage properties may become large more than necessary, the mechanical properties may become insufficient, and therefore the total amount of monomer is preferably 40% by mole or less, more preferably 30% by mole or less.

In a polyester used in the heat-shrinkable white polyester film of the present invention, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat-shrinkable polyester film obtained by using polyester containing these diols or polyhydric alcohols is hard to achieve a necessary high shrinkage ratio.

Further, in the polyester used in the heat-shrinkable white polyester film of the present invention, it is preferable not to contain diethylene glycol, triethylene glycol and polyethylene glycol as far as possible.

To a resin for forming the heat-shrinkable white polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber. By adding fine particles as lubricant to a resin for forming the heat-shrinkable white polyester film of the present invention, it is preferable to make workability (slipperiness) of the polyethylene-terephthalate-based resin film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 (when measured by coulter counter), and it can be suitably selected according to need.

As a method for compounding the above-described particles in a resin for forming the heat-shrinkable white polyester film, for example, they can be added in an arbitrary step in production of the polyester resin, but they are preferably added in a step of esterification, or in a step before start of polycondensation reaction after completion of ester exchange reaction as slurry dispersed in ethylene glycol etc., followed by carrying out polycondensation reaction. Further, it is also preferably carried out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

In order to obtain suitable whiteness in the present invention, for example, it is preferable to contain very fine voids internally. For example, a foaming agent or the like may be mixed and extruded, but as a preferable method, voids are obtained by mixing an incompatible thermoplastic resin in polyester, and drawing the mixture in at least a monoaxial direction. The thermoplastic resin incompatible with polyester used in the present invention is arbitrary, and not particularly restricted as long as it is incompatible with polyester. Specific examples thereof include a polystyrene resin, a polyolefin resin, a polyacrylic resin, a polycarbonate resin, a polysulfone resin, a cellulosic resin and the like. In particular, from formability of void, a polystyrene resin or a polyolefin resin such as polymethylpentene and polypropylene is preferable.

The polystyrene resin refers to a thermoplastic resin containing a polystyrene structure as a base constituent, and examples thereof include in addition to homopolymers such as atactic polystyrene, syndiotactic polystyrene and isotactic polystyrene, modified resins which are graft- or block-copolymerized with other components, for example, an impact-resistant polystyrene resin, a modified polyphenylene ether resin and the like, further, a mixture with a thermoplastic resin compatible with these polystyrene resins, for example, polyphenylene ether.

The polymethylpentene resin is a polymer having a unit derived from 4-methylpentene-1 of 80% by mol or more, preferably 90% by mol or more, and as other components, there are exemplified derived units from an ethylene unit, a propylene unit, a butene-1 unit, a 3-methylbutene-1 unit and the like. The melt flow rate of such polymethylpentene is preferably 200 g/10 minutes or less, and further preferably 30 g/10 minutes or less. This is because it becomes difficult to obtain a weight saving effect of film when the melt flow rate exceeds 200 g/10 minutes.

Examples of the polypropylene resin in the present invention include in addition to homopolymers such as isotactic polypropylene and syndiotactic polypropylene, and modified resins which are graft- or block-copolymerized with other components.

In preparing a polymer mixture obtained by mixing with the above-described incompatible resin with polyester, for example, chips of each resin may be mixed and melt-kneaded inside an extruder, then extruded, or those obtained by previously kneading both resins with a kneading machine may be further melt-extruded from an extruder. Further, a polystyrene resin is added in a polymerization process of polyester, and the chip obtained by stirring and dispersion may be melt-extruded.

The film described in the first to eighth items of means to solve the problems (hereinafter, sometimes referred to as first invention or film of first invention) is preferably provided with a Y layer having voids fewer than that of an X layer on at least one surface of the X layer containing a lot of voids internally. In order to obtain this constitution, it is preferable that different raw materials of X and Y are each charged in different extruders and melted, bonded together in a molten state before a T-die or inside the die, closely attached on a cooling roll to be solidified, then, drawn by a method described later. In this time, it is preferable that an incompatible resin of the Y layer as a raw material is less than that of the X layer. This makes it possible to produce a film having fewer voids of a Y layer, and smaller surface roughness without causing disfigurement of print. Since there is a part where many voids are not present in a film, stiffness of the film does not become weak, leading to a film excellent in mounting.

Further, for the heat-shrinkable white polyester film of the first invention, it is possible to conduct corona treatment, coating treatment, flame treatment or the like for improving the adhesiveness of the film surface.

In the heat-shrinkable white polyester film of the first invention, when it is treated for 10 seconds under no-load condition in hot water at 90° C., heat shrinkage in the width direction of the film calculated from the following Equation 1 (namely, hot-water heat shrinkage at 90° C.) is preferable to be 40% or more and 80% or less from the lengths before and after shrinkage.

$$\text{Heat shrinkage} = \{(\text{length before shrinkage} - \text{length after shrinkage})/\text{length before shrinkage}\} \times 100 \ (\%) \quad \text{Equation 1}$$

When the hot-water heat shrinkage in the width direction at 90° C. is less than 40%, since the amount of shrinkage is small, it is not preferable because wrinkle and sag generate on a label after heat shrinkage, conversely, when the hot-water heat shrinkage in the width direction at 90° C. is more than 80%, when the film is used as a label, distortion in shrinkage is liable to be generated during heat shrinkage or so-called "jumping up" may be generated at heat shrinkage, and therefore the case is not preferred. The lower limit value of the hot-water heat shrinkage in the width direction at 90° C. is preferably 45% or more, more preferably 50% or more, and particularly preferably 55% or more. The upper limit value of the hot-water heat shrinkage in the width direction at 90° C. is preferably 75% or less, more preferably 70% or less, and particularly preferably 65% or less.

Further, in the heat-shrinkable white polyester film of the first invention, preferably used in the present invention, when it is treated for 10 seconds under no-load condition in hot water at 90° C., from the lengths before and after shrinkage, heat shrinkage in the longitudinal direction (the direction orthogonal to the main shrinkage direction) of the film calculated from the foregoing Equation 1 (namely, hot-water heat shrinkage at 90° C.) is preferable 0% or more and 15% or less, more preferably 13% or less, further preferably 12% or less, further more preferably 11% or less, and particularly preferably 9% or less.

When the hot-water heat shrinkage in the longitudinal direction at 90° C. is less than 0% (namely, shrinkage ratio is a negative value), it is not preferable because a good shrinkage appearance cannot be obtained when used as a label of a bottle, conversely, when the hot-water heat shrinkage in the longitudinal direction at 90° C. is more than 15%, it is not preferable because strain in shrinkage at heat shrinkage tends to occur when used as a label. The lower limit value of the hot-water heat shrinkage in the longitudinal direction at 90° C. is preferably 1% or more, more preferably 2% or more, and particularly preferably 3% or more.

Regarding the heat-shrinkable white polyester film of the first invention, it is preferable that the shrinkage stress in the width direction is 3 MPa or more and 15 MPa or less when heated at 90° C. In the case where shrinkage stress in the width direction when heated at 90° C. is less than 3 MPa, it is not preferable because a good shrinkage appearance cannot be obtained when used as a label of a bottle, conversely, in the case where shrinkage stress in the width direction when heated at 90° C. is more than 15 MPa, it is not preferable because strain in shrinkage at heat shrinkage tends to occur when used as a label. The lower limit value of the shrinkage stress in the width direction when heated at 90° C. is more preferably 4 MPa or more, further preferably 5 MPa or more, and particularly preferably 6 MPa or more. Further, the upper limit value of the shrinkage stress in the width direction when heated at 90° C. is more preferably 15 MPa or less, furthermore preferably 13 MPa or less, even more preferably 11 MPa or less, and particularly preferably 9 MPa or less.

Further, in the heat-shrinkable white polyester film of the first invention, when right-angled tearing strength per unit thickness in the longitudinal direction after being shrunk by 10% in the width direction in hot water at 80° C. is obtained by the following method, the right-angled tearing strength per unit thickness in the longitudinal direction is preferable 90 N/mm or more and 200 N/mm or less.

[Measuring Method of Right-Angled Tearing Strength]

After the film is shrunk by 10% in the width direction in hot water adjusted at 80° C., it is sampled as a specimen with a predetermined size in accordance with JIS-K-7128. Thereafter, both edges of the specimen are held by a universal tensile tester and strength at tensile break in the longitudinal direction of film is measured in a condition of 200 mm/min in tensile speed. Then, right-angled tearing strength per unit thickness is calculated using the following Equation 2.

Right-angled tearing strength=strength at tensile break/thickness    Equation 2

When the right-angled tearing strength after being shrunk by 10% in the width direction in hot water at 80° C. is less than 90 N/mm, a situation in which the film is easily torn by an impact such as falling during transportation is possibly caused when the film is used as a label, whereby the case is unpreferred, conversely, when the right-angled tearing strength is more than 200 N/mm, it is not preferable because cutting property (easiness of tearing) become bad at an early stage of tearing a label. The lower limit value of the right-angled tearing strength is more preferably 110 N/mm or more, furthermore preferably 130 N/mm or more. Further, the upper limit value of the right-angled tearing strength is more preferably 190 N/mm or less, furthermore preferably 180 N/mm or less. The right-angled tearing strength can be adjusted to be further lower by producing voids in the film by increasing the amount of additives in a resin.

In the heat-shrinkable white polyester film of the first invention, when tensile breaking strength in the longitudinal direction is obtained by the following method, the tensile breaking strength is preferably 100 MPa or more and 250 MPa or less.

[Measuring Method of Tensile Breaking Strength]

A rectangular specimen with a predetermined size is produced in accordance with JIS-K-7113, both edges of the specimen are held by a universal tensile tester and a tensile test was carried out in a condition of 200 mm/min in tensile speed, strength (stress) at tensile break in the longitudinal direction of film is calculated as tensile breaking strength.

When the tensile breaking strength in the longitudinal direction is less than 100 MPa, it is not preferable because stiffness becomes weak when attached on a bottle etc. as a label, conversely, when the tensile breaking strength is more than 250 MPa, it is not preferable because cutting property (easiness of tearing) become bad at an early stage of tearing a label. The lower limit value of the tensile breaking strength is preferably 120 MPa or more, more preferably 140 MPa or more, and particularly preferably 150 MPa or more. The upper limit value of right-angled tearing strength is preferably 240 MPa or less, more preferably 230 MPa or less, and particularly preferably 220 MPa or less.

In the heat-shrinkable white polyester film of the first invention, it is preferable that irregularity of thickness in the width direction (irregularity of thickness when measuring length is 1 m) is 12% or less. When the irregularity of thickness in the width direction is more than 12%, it is not preferable because irregularity of printing tends to occur in printing in a label production and irregularity of shrinkage tends to occur after heat shrinkage. The irregularity of thickness in the width direction is more preferably 10% or less and particularly preferably 8% or less. The smaller the irregularity of thickness in the width direction, the better, but it is considered that the lower limit of the irregularity of thickness is about 1% from performance of film forming equipment.

The thickness of the heat-shrinkable white polyester film of the first invention is not particularly limited, but 5 to 200 µM is preferable as a heat-shrinkable film for a label, and 10 to 70 µm is more preferable.

Further, in the heat-shrinkable white polyester film of the first invention, it is preferable that irregularity of thickness in the longitudinal direction (irregularity of thickness when measuring length is 10 m) is 12% or less. When the irregularity of thickness in the longitudinal direction is more than 12%, it is not preferable because irregularity of printing tends to occur in printing in a label production and irregularity of shrinkage tends to occur after heat shrinkage. The irregularity of thickness in the longitudinal direction is more preferably 10% or less and particularly preferably 8% or less. Further, the smaller the irregularity of thickness in the longitudinal direction, the better, but it is considered that the lower limit of the irregularity of thickness is about 1% from performance of a film forming equipment.

Furthermore, the heat-shrinkable white polyester film of the first invention preferably has solvent adhesive strength of 2 (N/15 mm) or more, and 4 (N/15 mm) or more is more preferable. When the solvent adhesive strength is less than 2 (N/15 mm), it is not preferable because it tends to peel from a solvent-bonded part after heat shrinkage of the label. The solvent adhesive strength is more preferably 6 (N/15 mm) or more, and particularly preferably 8 (N/15 mm) or more. Additionally, the higher the solvent adhesive strength, the better, but it is considered that the upper limit of the solvent adhesive strength is about 15 (N/15 mm) from performance of a film forming equipment.

In the heat-shrinkable white polyester film of the first invention, it is preferable that dynamic friction coefficient (dynamic friction coefficient when the front surface and the rear surface of the heat-shrinkable polyester film are joined) is 0.1 or more and 0.55 or less. When the dynamic friction coefficient is less than 0.1, or more than 0.55, it is not preferable because processabilities in processing into a label become bad. The lower limit value of dynamic friction coefficient is more preferably 0.15 or more, and particularly preferably 0.2 or more. Further, the upper limit value of the dynamic friction coefficient is more preferably 0.50 or less, and particularly preferably 0.45 or less.

Molecular orientation ratio (MOR) in the first invention is preferably 1.05 or more and 3 or less. When the molecular orientation ratio is more than 3, it is not rather preferable because orientation in the longitudinal direction becomes low, and the right-angle tear strength in the longitudinal direction of the film is hardly satisfied. The molecular orientation ratio is preferably 2.8 or less, further preferably 2.6 or less. The molecular orientation ratio is preferably close to 1, but it may be 1.05 or more.

[Measuring Method of Molecular Orientation Ratio]

A sample of a film in longitudinal direction×width direction=140 mm×100 mm was obtained. Then, the sample was measured for a molecular orientation ratio (MOR) using a molecular orientation angle measuring instrument (MOA-6004) manufactured by Oji Scientific Instruments Co., Ltd.

In order to satisfy the foregoing properties, the film of the first invention may be composed of a single layer, but preferably, the layer constitution is X/Y, Y/X/Y or Y/X/Z. The thickness ratio of an X layer to a Y layer is preferably X/Y=2/1 or more, more preferably 4/1 or more, and further preferably 6/1 or more. When less than 1/1, it is difficult to satisfy both beauty of printing and lowering of apparent density. Y/X/Y is preferable for suppressing an undesirable curling after shrinkage treatment.

When a Z layer is provided, the content of voids is arbitrary, and it is possible to add particles for controlling the slippage between a bottle and a film upon shrinkage.

A cushion rate for the film of the first invention is 10% or more, and preferably 20% or more. When the cushion rate is low, the breakage preventing effect of a pot or bottle will deteriorate.

In addition, in the case of providing the heat-shrinkable white polyester film of the first invention in a laminated structure, the thickness of each layer is not particularly limited, and preferably adjusting to 2 μm or more.

A method for producing the heat-shrinkable white polyester film of the first invention is not particularly restricted, and described with reference to examples. The foregoing polyester raw material is melt-extruded by an extruder to form an undrawn film, and the undrawn film is biaxially drawn by a predetermined method shown below and heat-treated. If necessary, for obtaining a laminated undrawn film, raw materials of a plurality of resin compositions can be co-extruded as well.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

The undrawn film obtained is drawn in the longitudinal direction under a predetermined condition as described below, and the film after lengthwise drawing is quenched, and then heat-treated once, the film after the heat treatment is cooled in a predetermined condition, and then drawn in the width direction under a predetermined condition, and heat-treated once again, thereby obtaining a heat-shrinkable white polyester film of the first invention. Hereinafter, a preferable film forming method to obtain a heat-shrinkable white polyester film of the first invention is described in detail by considering the difference from the film forming method of the conventional heat-shrinkable polyester film.

[Film Forming Method of Heat-Shrinkable White Polyester Film of the First Invention]

As described above, generally, a heat-shrinkable polyester film can be produced by drawing an undrawn film only in a direction to be shrunk (namely, main shrinkage direction, ordinarily width direction). The present inventors have studied on the conventional production method, and as a result, it has been found that there are the following problems in production of the conventional heat-shrinkable polyester film.

In the case of simply drawing in the width direction, as described above, mechanical strength in the longitudinal direction becomes small, perforation-tear property as a label become bad. In addition, it is difficult to increase a line speed of a film forming equipment.

In the case of adopting a method of drawing in the longitudinal direction after drawing in the width direction, using any drawing condition cannot sufficiently exhibit shrinkage force in the width direction. Furthermore, it exhibits shrinkage force in the longitudinal direction at the same time, so that finishing after being shrunk and attached as a label becomes bad.

In the case of adopting a method of drawing in the width direction after drawing in the longitudinal direction, although it can exhibit shrinkage force in the width direction, it exhibits shrinkage force in the longitudinal direction at the same time, so that finishing after being shrunk and attached as a label becomes bad.

Furthermore, based on problems in the production of the foregoing conventional heat-shrinkable polyester film, the present inventors have studied further on consideration for obtaining a heat-shrinkable white polyester film with good perforation-tear property and high productivity, and as a result, they have achieved the following knowledge.

In order for perforation-tear property as a label to be good, it is considered that molecules oriented in the longitudinal direction need to be left in some extent.

In order for finishing after shrinkage-attachment as a label to be good, it is essential not to exhibit shrinkage force in the longitudinal direction, therefore it is considered that the state of tension of molecules oriented in the longitudinal direction need to be canceled out.

It is considered that when a part with voids is provided in a film, it works further advantageously on perforation-opening, and since the film is different from a simple monoaxially-drawn film with voids, the area drawing ratio can be enlarged, and the effect is enhanced by a special lengthwise-transverse drawing method described below.

Then, the present inventors have reached a conclusion that in order to satisfy good perforation-tear property and finish properties after shrinkage simultaneously from the above-described knowledge, "molecules not contributed to shrinkage force while being oriented in the longitudinal direction" need to be present in a film. Then, they have paid attention on how to carry out drawing in order for "molecules not contributed to shrinkage force while being oriented in the longitudinal direction" to be able to be present in a film and had a trial and error. As a result, they have reached the present invention based on the following: drawing is carried out in the width direction after drawing is carried out in the longitudinal direction, what is called, in production of a film by a lengthwise-transverse drawing method, by conducting the following means, "molecules not contributed to shrinkage force while being oriented in the longitudinal direction" to be present in a film can be realized, thereby to obtain a heat-shrinkable white polyester film satisfying good perforation-tear property and finish properties after shrinkage at the same time.

(1) Control of lengthwise drawing condition
(2) Intermediate heat treatment after lengthwise drawing
(3) Natural cooling (shutoff of heating) between intermediate heat treatment and transverse drawing
(4) Forced cooling of film after natural cooling
(5) Control of transverse drawing condition Hereinafter, each means described above is described sequentially.

(1) Control of Lengthwise Drawing Condition

In the process for production of a film preferably used in the first invention by a lengthwise-transverse drawing method, it is preferable to conduct the lengthwise drawing in two steps for obtaining a film roll of the first invention. Namely, a substantially unoriented film is lengthwisely drawn (first drawing step) 2.2 times or more and 3.0 times or less at a temperature of Tg or more and Tg+30° C. or less, and then without cooling below Tg lengthwisely drawn 1.2 times or more and 1.5 times or less at a temperature of Tg+10° C. or more and Tg+40° C. or less (second drawing step), thereby preferably to be lengthwisely drawn 2.8 times or more and 4.5 times or less in the total lengthwise drawing ratio (namely, lengthwise drawing ratio in the first step×lengthwise drawing ratio in the second step), more preferably to be lengthwisely drawn 3.0 times or more and 4.3 times or less in the total lengthwise drawing ratio.

It is preferable to adjust the condition of lengthwise drawing so that the thermal shrinkage stress in the longitudinal direction of a film after lengthwise drawing is 10 MPa or less. By conducting the lengthwise drawing under such a predetermined condition, it becomes possible to control the degree of orientation in the longitudinal and width directions of a film, and the degree of molecular tension, in the following intermediate heat treatment, transverse drawing and final heat treatment, and consequently, it becomes possible to make perforation-opening of a final film good, since it is worked furthermore by voids provided in a film.

In conducting the lengthwise drawing as described above, when the total lengthwise drawing ratio becomes high, shrinkage ratio in the longitudinal direction tends to become high, but by drawing in the lengthwise direction in two steps as described above, it becomes possible to reduce drawing stress in the longitudinal direction, and to suppress shrinkage ratio in the longitudinal direction at a low level. Further, when the total lengthwise drawing ratio becomes high, stress in drawing in the width direction becomes high, there is a tendency that control of final shrinkage ratio in the transverse direction becomes difficult, but by drawing in two steps, it becomes possible to make drawing stress in the transverse direction small, and it becomes easy to control the shrinkage ratio in the transverse direction.

Furthermore, when the total lengthwise drawing ratio becomes high, right-angled tear strength becomes low, and tensile strength in the longitudinal direction becomes high. Further, by approximating the total lengthwise drawing ratio to the transverse drawing ratio, perforation-opening property can be made good as a label. Furthermore, by drawing in the lengthwise direction in two steps, due to being capable of lowering drawing stress in the transverse direction, it becomes possible to increase the orientation of longitudinal direction, so that right-angled tear strength becomes further low, and tensile strength in the longitudinal direction becomes larger. Therefore, by drawing in the lengthwise direction in two steps and increasing the total lengthwise drawing ratio, it becomes possible to obtain a label with very good perforation-tear property.

On the other hand, when the total lengthwise drawing ratio exceeds 4.5 times, orientation in the longitudinal direction becomes high, and solvent adhesive strength becomes low, but by controlling the total lengthwise drawing ratio to be 4.5 times or less, it becomes possible to suppress the orientation in the width direction and keep solvent adhesive strength high. Further, when the total lengthwise drawing ratio exceeds 4.5 times, roughness of surface layer becomes small, so that dynamic friction coefficient becomes high, but by controlling the total lengthwise drawing ratio to be 4.5 times or less, it becomes possible to suppress a decrease in roughness of surface layer and keep dynamic friction coefficient low.

Further, by drawing in the lengthwise direction in two steps, drawing stress in the longitudinal direction becomes small, so that there is a tendency that irregularity of thickness in the longitudinal direction and irregularity of thickness in the width direction become large, but by increasing the total lengthwise drawing ratio, it is possible to reduce irregularity of thickness in the longitudinal direction. In addition, by increasing the total lengthwise drawing ratio, it is possible to reduce irregularity of thickness in the width direction because stress in transverse drawing becomes high.

In addition, by increasing the total lengthwise drawing ratio, it is possible to increase orientation in the longitudinal direction, thus it is possible to improve slitting property in winding a film after biaxial drawing finally into a roll.

(2) Intermediate Heat Treatment after Lengthwise Drawing

As described above, in order for "molecules not contributed to shrinkage force while being oriented in the longitudinal direction" to be present in a film, it is preferable to thermally relax molecules oriented in the longitudinal direction, but conventionally, in biaxial drawing of a film, between the first-axial drawing and the second-axial drawing, when a film is subjected to heat treatment at high temperature, the film is crystallized after heat treatment, so that the film cannot be drawn more, this fact was the technical common knowledge in the art. However, the present inventors have had a trial and error, and as a result, a surprising fact has been found out as follows; in a lengthwise-transverse drawing method, lengthwise drawing is conducted in a certain constant condition, an intermediate heat treatment is conducted in a predetermined condition with adjusting to the state of the film after the lengthwise drawing, and furthermore, with adjusting to the state of the film after the intermediate heat treatment, transverse drawing is conducted in a predetermined condition, thereby without causing breakage in the transverse drawing, to be able to make "molecules not contributed to shrinkage force while being oriented in the longitudinal direction" present in the film.

Namely, in the production of the film by a lengthwise-transverse drawing method in the first invention, after an undrawn film is lengthwisely drawn, under a state that both edges in the width direction are held by clips in a tenter, it is preferable to conduct heat treatment (hereinafter called intermediate heat treatment) at a temperature of 130° C. or more and 190° C. or less for 1.0 second or more and 9.0 seconds or less. By conducting such intermediate heat treatment, it becomes possible that "molecules not contributed to shrinkage force while being oriented in the longitudinal direction" can be present in a film, from which it becomes possible to obtain a film in which perforation-opening property are good as a label and no irregularity of shrinkage generates. Even in the case where any lengthwise drawing is conducted, "molecules not contributed to shrinkage force while being oriented in the longitudinal direction" cannot be necessarily to be present in a film, but by conducting the foregoing predetermined lengthwise drawing, it becomes possible that "molecules not contributed to shrinkage force while being oriented in the longitudinal direction" can be present in a film for the first time after intermediate heat treatment. Then, by conducting the following predetermined natural cooling, forced cooling and transverse drawing, it becomes possible to orient molecules to the width direction and exhibit shrinkage force in the width direction while maintaining "molecules not contributed to shrinkage force while being oriented in the longitudinal direction."

The lower limit of the temperature in intermediate heat treatment is preferably 140° C. or more, and more preferably 150° C. or more. Further, the upper limit of the temperature in intermediate heat treatment is preferably 180° C. or less, and more preferably 170° C. or less. On the other hand, the time of intermediate heat treatment is preferably suitably adjusted in a range of 1.0 second or more and 9.0 seconds or less according to the composition of raw materials, and it is preferably adjusted in 3.0 seconds or more and 7.0 seconds or less.

Further, in conducting the intermediate heat treatment as described above, it is preferable to adjust conditions of intermediate heat treatment such that heat shrinkage stress in the longitudinal direction of the film after intermediate heat treatment is 0.5 MPa or less. Furthermore, it is preferable to adjust conditions of intermediate heat treatment such that tensile break elongation in the longitudinal direction of the film after intermediate heat treatment is 100% or more and 170% or less. By conducting the intermediate heat treatment in such a predetermined condition, it becomes possible to control degree of orientation in the longitudinal and width directions of the film and degree of tension of molecule, in transverse drawing and final heat treatment, from which perforation-opening property of the final film can be made good. When tensile break elongation in the longitudinal direction of the film after intermediate heat treatment is less than 100%, since the film is brittle, a transverse drawing characteristic is bad, and breakage tends to occur in transverse drawing. Conversely, when tensile break elongation in the longitudinal direction of the film after intermediate heat treatment is more than 170%, even by adjusting conditions of transverse drawing and final heat treatment, it becomes difficult to obtain a film with good perforation-opening property.

Furthermore, conducting the intermediate heat treatment as described above, it is preferable to adjust conditions of intermediate heat treatment such that right-angled tear strength in the longitudinal direction of the film after intermediate heat treatment is 200 N/mm or less. By conducting the intermediate heat treatment in such a predetermined condition, it becomes possible to suppress a sharp increase of right-angled tear strength in the longitudinal direction in transverse drawing, and it becomes possible to make perforation-opening property of the final film good.

As described above, by maintaining the treatment temperature at 130° C. or more in conducting the intermediate heat treatment, it becomes possible to reduce shrinkage force to the longitudinal direction, so that it becomes possible to greatly reduce shrinkage in the longitudinal direction. Further, when the temperature of intermediate heat treatment is set to 190° C. or more, unevenness of shrinkage ratio in the transverse direction becomes large, but by controlling the treatment temperature of intermediate heat treatment at 190° C. or less, it becomes possible to reduce the unevenness of shrinkage ratio in the transverse direction.

Further, when the treatment temperature exceeds 190° C. in conducting the intermediate heat treatment, the surface layer of the film crystallizes, and solvent adhesive strength becomes low, but by controlling the temperature of intermediate heat treatment at 190° C. or less, it becomes possible to suppress crystallization of the surface layer of the film and keep solvent adhesive strength high. In addition, by controlling the treatment temperature at 130° C. or more, it becomes possible to lower a friction coefficient by increasing the surface roughness of the surface layer suitably.

Furthermore, when the treatment temperature exceeds 190° C. in conducting the intermediate heat treatment, there is a tendency that irregularity of thickness in the longitudinal and irregularity of thickness in the width directions become large because irregularity of shrinkage generates in the film, but by controlling the temperature of intermediate heat treatment at 190° C. or less, it becomes possible to keep irregularity of thickness in the longitudinal direction low. In addition, when the treatment temperature exceeds 190° C. in conducting the intermediate heat treatment, the film crystallizes and there is a tendency that irregularity of thickness in the width direction becomes large due to variation of stress in transverse drawing, but by controlling the temperature of intermediate heat treatment at 190° C. or less, it becomes possible to suppress crystallization of the film and keep irregularity of thickness in the width direction low.

Further, when the treatment temperature exceeds 190° C. in conducting the intermediate heat treatment, slitting property of the film deteriorate in production or breakage of the film tends to occur due to generation of irregularity of shrinkage in the film, but by controlling the temperature of intermediate heat treatment at 190° C. or less, it becomes possible to suppress breakage of the film, and maintain good slitting property.

(3) Natural Cooling (Shutoff of Heating) Between Intermediate Heat Treatment and Transverse Drawing In production of a film by the lengthwise-transverse drawing method in the first invention, as described above, it is preferable to conduct intermediate heat treatment after lengthwise drawing, however, between the lengthwise drawing and intermediate heat treatment, the film is preferable to be passed through an intermediate zone where no heating operation is carried out actively for 0.5 seconds or more and 3.0 seconds or less. Namely, it is preferable that an intermediate zone is provided in front of a transverse drawing zone of a tenter for transverse drawing, a film after lengthwise drawing is introduced to the tenter and passed through the intermediate zone for a predetermined time, and then transverse drawing is carried out. In addition, in the intermediate zone, when a strip of paper is hung down without passing a film, an associated stream accompanied by movement of the film and hot air from the cooling zone are preferably shut off such that the paper strip hangs down almost completely in the vertical direction. When time for passing through the intermediate zone is less than 0.5 seconds, it is not preferable because transverse drawing becomes a high-temperature drawing, and shrinkage ratio in the transverse direction cannot be increased sufficiently. Conversely, 3.0 seconds are sufficient time for passing through the intermediate zone, and even though setting a longer time than that, it will lead to needlessness of equipment, which is not preferable. The lower limit of the time for passing through the intermediate zone is preferably 0.7 seconds or more, and more preferably 0.9 seconds or more. Further, the upper limit of the time for passing through the intermediate zone is preferably 2.8 seconds or less, and more preferably 2.6 seconds or less.

(4) Forced Cooling of the Film after Natural Cooling

In production of a film by the lengthwise-transverse drawing method in the first invention, as described above, the film naturally cooled is not transversely drawn as it is, but it is preferable that a temperature of the film is quenched to be 80° C. or more and 120° C. or less. By conducting such quenching treatment, it becomes possible to obtain a film with good perforation-opening property as a label. The lower limit of the temperature of the film after quenching is preferably 85° C. or more, and more preferably 90° C. or more. Further, the upper limit of the temperature of the film after quenching is preferably 115° C. or less, and more preferably 110° C. or less.

As described above, in quenching a film, when the temperature of the film after quenching keeps exceeding 120° C., shrinkage ratio in the width direction of the film becomes low and shrinkage becomes insufficient as a label, but by controlling the temperature of the film after quenching at 120° C. or less, it becomes possible to maintain shrinkage ratio in the width direction of the film high.

Further, in quenching a film, when the temperature of the film after quenching keeps exceeding 120° C., there is a tendency that the film crystallizes, tensile strength in the longitudinal direction is lowered and solvent adhesive strength is lowered, but by quenching a temperature of the film after cooling to be 120° C. or less, it becomes possible to maintain tensile strength in the longitudinal direction and solvent adhesive strength high.

Further, in quenching a film, when the temperature of the film after keeps continues exceeding 120° C., stress of transverse drawing carried out after cooling becomes small, and irregularity of thickness in the width direction tends to become large, but by quenching a temperature of the film after cooling to be 120° C. or less, it becomes possible to increase the stress of transverse drawing carried out after cooling and to reduce the irregularity of thickness in the width direction.

In addition, in quenching a film, when the temperature of the film after quenching keeps exceeding 120° C., breakage of the film tends to occur due to crystallization of the film, but by quenching a temperature of the film after cooling to be 120° C. or less, it becomes possible to suppress the breakage of the film.

(5) Control of Transverse Drawing Condition

In production of a film by the lengthwise-transverse drawing method in the first invention, it is preferable to transversely drawing a film in a predetermined condition after lengthwise drawing, intermediate heat treatment and quenching. Namely, the transverse drawing is preferable to be carried out such that the ratio becomes 2.0 times or more and 6.0 times or less at a temperature of Tg+10° C. or more and Tg+40° C. or less, in a state that both edges in the width direction are held by clips in a tenter. By conducting the transverse drawing in such a predetermined condition, it becomes possible to orient molecules to the width direction and exhibit shrinkage force in the width direction while maintaining "molecules not contributed to shrinkage force while being oriented in the longitudinal direction" formed by lengthwise drawing and intermediate heat treatment. By conducting the lengthwise-transverse drawing, the area drawing ratio larger than that of a simple monoaxially-drawn film with voids can be obtained and perforation-opening property can be further improved. The improvement of the perforation-opening property corresponds to the lowing of right-angled tear strength. The lower limit of the temperature of transverse drawing is preferably Tg+15° C. or more, and more preferably Tg+20° C. or more. The upper limit of the temperature of transverse drawing is preferably Tg+35° C. or less, and more preferably Tg+30° C. or less. On the other hand, the lower limit of transverse drawing ratio is preferably 2.5 times or more, and more preferably 3.0 times or more. Further, the upper limit of transverse drawing ratio is preferably 5.5 times or less, and more preferably 5.0 times or less. In respect to obtain a smaller apparent density, it is also preferable to conduct the lengthwise-transverse drawing, which can provide the area drawing ratio larger than that of the conventional monoaxially-drawn film.

As described above, in drawing in the transverse direction, when drawing temperature is increased, tensile strength in the longitudinal direction becomes large, right-angled tear strength in the longitudinal direction is lowered, and perforation-opening property as a label become good.

Further, when drawing temperature exceeds Tg+40° C., shrinkage ratio in the longitudinal direction becomes high and also shrinkage ratio in the width direction becomes low, but by controlling the drawing temperature at Tg+40° C. or less, it becomes possible to suppress the shrinkage ratio in the longitudinal direction low and maintain the shrinkage ratio in the width direction high.

Furthermore, when drawing temperature in the transverse direction becomes high, orientation in the transverse direction becomes low, solvent adhesive strength becomes high and also it becomes possible to prevent pressure-crash of lubricant and keep a friction coefficient low.

Further, when drawing temperature exceeds Tg+40° C., there is a tendency that irregularity of thickness in the width direction becomes large, but by controlling the drawing temperature at Tg+40° C. or less, it becomes possible to reduce the irregularity of thickness in the width direction.

On the other hand, when drawing temperature is less than Tg+10° C., orientation to the width direction becomes too high, breakage tends to occur in transverse drawing, slitting property in winding a film after biaxial drawing finally into a roll become bad, but by controlling the drawing temperature at Tg+10° C. or more, it becomes possible to reduce the breakage in transverse drawing and improve slitting property in winding a film.

[Influence of Interaction in Production Process on Film Properties]

In production of a heat-shrinkable white polyester film of the first invention, any one process of the lengthwise drawing step, the intermediate heat treatment step, the natural cooling step, the forced cooling step and the transverse drawing step cannot make film properties good, but it is considered that by conducting all of the lengthwise drawing step, the intermediate heat treatment step, the natural cooling step, the forced cooling step and the transverse drawing step in predetermined conditions, it becomes possible to make film properties very efficiently good. Further, among the film properties, the important properties such as right-angled tear strength in the longitudinal direction, tensile break strength in the longitudinal direction, irregularity of thickness in the width direction, dynamic friction coefficient and irregularity of thickness in the longitudinal direction greatly vary in the values depending on interactions of a plurality of specific steps each other.

Namely, in the heat-shrinkable white polyester film of the first invention, right-angled tearing strength in the longitudinal direction is preferably adjusted to 90 N/mm or more and 200 N/mm or less, more preferably 130 N/mm or more and 180 N/mm or less. Interaction between lengthwise drawing step and intermediate heat treatment step has very greatly influence on the right-angled tearing strength in the longitudinal direction. Further, as described above, when voids are formed by increasing the amount of additives in a resin, the right-angle tear strength in the longitudinal direction can be adjusted to be small.

Further, in the heat-shrinkable white polyester film of the first invention, tensile breaking strength in the longitudinal direction is preferably adjusted to 100 MPa or more and 250 MPa or less, and on the tensile breaking strength in the longitudinal direction, interaction of three steps of the lengthwise drawing step, the intermediate heat treatment step and the transverse drawing step has influence very largely.

Furthermore, in the heat-shrinkable white polyester film of the first invention, irregularity of thickness in the width direction is preferably adjusted to 1.0% or more and 12.0% or less, and on the irregularity of thickness in the width direction, interaction of three steps of the lengthwise drawing step, the intermediate heat treatment step and the transverse drawing step has influence very largely.

In the heat-shrinkable white polyester film of the first invention, dynamic friction coefficient is preferably adjusted to 0.1 or more and 0.55 or less, and on the dynamic friction coefficient, interaction between the lengthwise drawing step and intermediate heat treatment step has influence very largely.

Further, in the heat-shrinkable white polyester film of the first invention, irregularity of thickness in the longitudinal direction is preferably adjusted to 1.0% or more and 12.0% or less. Interaction between the longitudinal drawing step and intermediate heat treatment step has influence very largely on the irregularity of thickness in the longitudinal direction.

Therefore, in order to adjust right-angled tearing strength in the longitudinal direction, tensile breaking strength, irregularity of thickness in the width direction, dynamic friction coefficient and irregularity of thickness in the longitudinal direction of the heat-shrinkable white polyester film into the range of the first invention, while considering the above-described interaction of steps each other, delicate adjustment of conditions such as the above-described (1) to (5) is required.

The film described in the eleventh to seventeenth items of means to solve the problems (hereinafter, sometimes referred to as second invention or film of second invention) is preferably provided with a B layer having voids fewer than that of an A layer on at least one surface of the A layer containing a lot of voids internally. In order to obtain this constitution, it is preferable that different raw materials of A and B are each charged in different extruders and melted, bonded together in a molten state before a T-die or inside the die, closely attached on a cooling roll to be solidified, then, drawn by a method described later. In this time, it is preferable that an incompatible resin of the B layer as a raw material is less than that of the A layer. This makes it possible to produce a film having fewer voids of a B layer, and smaller surface roughness without causing disfigurement of print. Since there is a part where many voids are not present in a film, stiffness of the film does not become weak, leading to a film excellent in mounting.

Further, for the heat-shrinkable white polyester film of the second invention, it is possible to conduct corona treatment, coating treatment, flame treatment or the like for improving the adhesiveness of the film surface.

In the heat-shrinkable white polyester film of the second invention, when it is treated for 10 seconds under no-load condition in hot water at 80° C., heat shrinkage in the longitudinal direction of the film calculated from the foregoing Equation 1 (namely, hot-water heat shrinkage at 80° C.) is preferably −2% or more and 4% or less from the lengths before and after shrinkage.

When the hot-water heat shrinkage in the longitudinal direction at 80° C. is less than −2% (namely, a film extend beyond 2% by heat treatment), it is not preferable because a good shrinkage appearance cannot be obtained when used as a label of a bottle, conversely, when the hot-water heat shrinkage in the longitudinal direction at 80° C. is more than 4%, it is not preferable because strain in shrinkage at heat shrinkage tends to occur when used as a label. Therefore the hot-water heat shrinkage in the longitudinal direction of the film is preferably −2% or more and 4% or less, more preferably −1% or more and 3% or less, further preferably 0% or more and 2% or less. Here, in regard to a reason for adopting a measuring temperature of 80° C., it is a temperature comparable to the actual temperature of a label in passing the label through a shrink-tunnel by steam, for example, during a step of mounting the label on a container, and the temperature of 80° C. is adopted in order to ensure that the defect hardly occurs in the label mounting step.

In the heat-shrinkable white polyester film of the second invention, when it is treated for 10 seconds under no-load condition in hot water at 95° C., heat shrinkage in the width direction of the film calculated from the foregoing Equation 1 (namely, hot-water heat shrinkage at 95° C.) is preferably 50% or more and 80% or less from the lengths before and after shrinkage.

When the hot-water heat shrinkage in the width direction at 95° C. is less than 50%, since the amount of shrinkage is small, it is not preferable because wrinkle and sag generate on a label after heat shrinkage. When the hot-water heat shrinkage in the width direction at 95° C. is more than 80%, when the film is used as a label, distortion in shrinkage is liable to be generated during heat shrinkage or so-called "jumping up" may be generated at heat shrinkage, and therefore the case is not preferred. The hot-water heat shrinkage in the width direction of the film is preferably 50% or more and 80% or less, more preferably 52% or more and 78% or less, further preferably 55% or more and 75% or less. Here, in regard to a reason for adopting a measuring temperature of 95° C., the shrinkage potential in the width direction, which is the main shrinkage direction and where the largest shrinkage is achieved by the film, is a great concern to customers, and the temperature of 95° C., which is a temperature close to the temperature of boiling water, is adopted in order to express the shrinkage potential in the width direction.

Further, in the heat-shrinkable white polyester film of the second invention, when right-angled tearing strength per unit thickness in the longitudinal direction after being shrunk by 10% in the width direction in hot water at 80° C. is preferably 200 N/mm or more and 300 N/mm or less. The right-angled tearing strength is measured as mentioned above and calculated from the foregoing Equation 2.

When the right-angled tearing strength after being shrunk by 10% in the width direction in hot water at 80° C. is less than 200 N/mm, a situation in which the film is easily torn by an impact such as falling during transportation is possibly caused when the film is used as a label, whereby the case is unpreferred, conversely, when the right-angled tearing strength is more than 300 N/mm, it is not preferable because cutting property (easiness of tearing) become bad at an early stage of tearing a label. The lower limit value of the right-angled tearing strength is more preferably 210 N/mm or more. Further, the upper limit value of the right-angled tearing strength is more preferably 290 N/mm or less, furthermore preferably 280 N/mm or less.

The heat-shrinkable white polyester film of the second invention preferably has solvent adhesive strength of 2 (N/15 mm width) or more. When the solvent adhesive strength is less than 2 (N/15 mm width), it is not preferable because it tends to peel from a solvent-bonded part after heat shrinkage of the label. The solvent adhesive strength is more preferably 3 (N/15 mm) or more, and particularly preferably 4 (N/15 mm) or more. Additionally, the higher the solvent adhesive strength, the better, but it is considered that the upper limit of the solvent adhesive strength is about 10 (N/15 mm) from performance of a film forming equipment. When the solvent adhesive strength is too high, in bonding two films with a solvent to form a label, a situation that the film is bonded to an unnecessary film tends to occur, and the productivity of the label is sometimes lowered. Thus, the solvent adhesive strength may be not more than 8.5 (N/15 mm), or not more than 7 (N/15 mm) in view of practical use.

It is preferable that irregularity of thickness in the longitudinal direction (irregularity of thickness when measuring length is 10 m) is 18% or less. When the irregularity of thickness in the longitudinal direction is more than 18%, it is not preferable because irregularity of printing tends to occur in printing in a label production and irregularity of shrinkage tends to occur after heat shrinkage. The irregularity of thickness in the longitudinal direction is more preferably 16% or less and particularly preferably 14% or less. Further, the smaller the irregularity of thickness in the longitudinal direction, the better, but it is considered that the lower limit of the irregularity of thickness is about 5% from performance of film forming equipment. The irregularity of thickness is most preferably about 0%, but it is considered that the lower limit of the irregularity of thickness is 1% from performance of a film forming equipment.

In the heat-shrinkable white polyester film of the second invention, it is preferable that irregularity of thickness in the width direction (irregularity of thickness when measuring length is 1 m) is 18% or less. When the irregularity of thickness in the width direction is more than 18%, it is not preferable because irregularity of printing tends to occur in printing in a label production and irregularity of shrinkage tends to occur after heat shrinkage. The irregularity of thickness in the width direction is more preferably 16% or less and particularly preferably 14% or less. The smaller the irregularity of thickness in the width direction, the better, but it is considered that the lower limit of the irregularity of thickness is about 4% from performance of film forming equipment. The irregularity of thickness in the width direction is most preferably about 0%, but it is considered that the lower limit of the irregularity of thickness is 1% from performance of a film forming equipment.

The thickness of the heat-shrinkable white polyester film of the second invention is not particularly limited, but 20 to 80 μm is preferable as a heat-shrinkable film for a label, and 30 to 70 μm is more preferable. In addition, in the case of providing the heat-shrinkable white polyester film of the second invention in a laminated structure, the thickness of each layer is not particularly limited, and preferably adjusting to 2 μm or more.

Molecular orientation ratio (MOR) in the second invention is preferably 3.5 or more and 4.1 or less. When the molecular orientation ratio is more than 4.1, it is not rather preferable because orientation in the longitudinal direction becomes low, and the right-angle tear strength in the longitudinal direction of the film is hardly satisfied. The molecular orientation ratio is preferably 4.0 or less, further preferably 3.9 or less. The molecular orientation ratio is preferably close to 1, but it may be 3.5 or more in the second invention.

In order to satisfy the foregoing properties, the film of the second invention may be composed of a single layer, but preferably, the layer constitution is A/B, B/A/B or B/A/C. The thickness ratio of the A layer to a B layer is preferably A/B=2/1 or more, more preferably 4/1 or more, and further preferably 6/1 or more. When less than 1/1, it is difficult to satisfy both beauty of printing and lowering of apparent density. B/A/B is preferable for suppressing an undesirable curling after shrinkage treatment.

When a C layer is provided, the content of voids is arbitrary, and it is possible to add particles for controlling the slippage between a bottle and a film upon shrinkage.

A cushion rate for the film of the second invention is 10% or more, and preferably 20% or more. When the cushion rate is low, the breakage preventing effect of a pot or bottle will deteriorate.

A method for producing the heat-shrinkable white polyester film of the second invention is not particularly restricted, and described with reference to examples. The heat-shrinkable white polyester film of the second invention can be obtained in such a manner that a polyester raw material composed of ethylene terephthalate as a main constituent and containing 13% by mole or more in total of one or more monomer components capable of forming an amorphous component in the whole polyester resin component is melt-extruded by an extruder to form an undrawn film, and the undrawn film is biaxially drawn and heat-treated by a predetermined method shown below. If necessary, for obtaining a laminated undrawn film, raw materials of a plurality of resin compositions can be co-extruded as well.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

The undrawn film obtained is drawn in the longitudinal direction under a predetermined condition as described below, and the film after lengthwise drawing is quenched, and then heat-treated once, the film after the heat treatment is cooled in a predetermined condition, and then drawn in the width direction under a predetermined condition, and heat-treated once again, thereby obtaining a heat-shrinkable white polyester film of the second invention preferably. Hereinafter, a preferable film forming method to obtain a heat-shrinkable white polyester film of the second invention is described in detail by considering the difference from the film forming method of the conventional heat-shrinkable polyester film.

As described above, a conventional heat-shrinkable polyester film has been produced by drawing an undrawn film only in a direction to be shrunk (namely, main shrinkage direction, ordinarily width direction). The present inventors have studied on the conventional production method, and as a result, it has been found that there are the following problems in production of the conventional heat-shrinkable polyester film.

In the case of simply drawing in the width direction, as described above, mechanical strength in the longitudinal direction becomes small, perforation-tear property as a label become bad. In addition, it is difficult to increase a line speed of a film forming equipment.

In the case of adopting a method of drawing in the longitudinal direction after drawing in the width direction, using any drawing condition cannot sufficiently exhibit shrinkage force in the width direction. Furthermore, it exhibits shrinkage force in the longitudinal direction at the same time, so that finishing after being shrunk and attached as a label becomes bad.

In the case of adopting a method of drawing in the width direction after drawing in the longitudinal direction, although it can exhibit shrinkage force in the width direction, it exhibits shrinkage force in the longitudinal direction at the same time, so that finishing after being shrunk and attached as a label becomes bad.

Furthermore, based on problems in the production of the foregoing conventional heat-shrinkable polyester film, the present inventors have studied further on consideration for obtaining a heat-shrinkable white polyester film with good perforation-tear property and high productivity, and as a result, they consider the following surmise at the present time.

In order for perforation-tear property as a label to be good, it is considered that molecules oriented in the longitudinal direction need to be left in some extent.

In order for finishing after shrinkage-attachment as a label to be good, it is essential not to exhibit shrinkage force in the longitudinal direction, therefore it is considered that the state of tension of molecules oriented in the longitudinal direction need to be canceled out.

It is considered that when a part with voids is provided in a film, it works further advantageously on perforation-opening, and since the film is different from a simple monoaxially-drawn film with voids, the area drawing ratio can be enlarged, and the effect is enhanced by a special lengthwise-transverse drawing method described below.

Then, the present inventors have reached a conclusion that in order to satisfy good perforation-tear property and finish properties after shrinkage simultaneously from the above-described knowledge, "molecules not contributed to shrinkage force while being oriented in the longitudinal direction" need to be present in a film. Then, they have paid attention on how to carry out drawing in order for "molecules not contributed to shrinkage force while being oriented in the longitudinal direction" to be able to be present in a film and had a trial and error. As a result, they have reached the present invention based on the following: drawing is carried out in the width direction after drawing is carried out in the longitudinal direction, what is called, in production of a film by a lengthwise-transverse drawing method, by conducting the following means, "molecules not contributed to shrinkage force while being oriented in the longitudinal direction" to be present in a film can be realized, thereby to obtain a heat-shrinkable white polyester film satisfying good perforation-tear property and finish properties after shrinkage at the same time.

(1) Control of lengthwise drawing condition
(2) Intermediate heat treatment after lengthwise drawing
(3) Forced cooling of film after intermediate heat treatment
(4) Control of transverse drawing condition Hereinafter, each means described above is described sequentially.

(1) Control of Lengthwise Drawing Condition

In producing a film by the lengthwise and transverse drawing method in the second invention, in order to obtain the film roll of the second invention, it is preferable that in a lengthwise drawing process of substantively one step in the longitudinal direction alone at a temperature of 75° C. or more and 100° C. or less, lengthwise drawing is conducted by a relatively low ratio of 1.1 times or more and 1.8 times or less.

By conducting the lengthwise drawing at a low ratio as described above, it becomes possible to control the degree of orientation in the longitudinal and width directions of a film and the degree of molecular tension in the following intermediate heat set, transverse drawing and final heat treatment, and consequently, it becomes possible to make perforation-opening property of a final film good, since it is worked furthermore by voids provided in a film. When the drawing ratio of lengthwise drawing is less than 1.1 times, a merit of lengthwise drawing is not exhibited substantively, the right-angle tear strength in the longitudinal direction becomes large, which is not rather preferable because there is a case where perforation-opening property deteriorates when used as a label. There is a tendency that the number of initial breaks increases, further, it is difficult to increase a line speed of a film-producing equipment. When the drawing ratio of lengthwise drawing is more than 1.8 times, although preferable data are obtained on right-angle tear strength and the number of initial breaks, the shrinkage rate in the longitudinal direction tends to become large, which is not preferable.

Though irregularity of thickness in the lengthwise direction increases as the drawing ratio in the lengthwise direction becomes large, according to the study of the present inventors, there is observed a tendency that it becomes maximum at about 2.5 times, thereafter it lowers. That is, by setting the drawing ratio of lengthwise drawing to a relatively low ratio of 1.1 to 1.8 times, an effect of decreasing irregularity of thickness in the lengthwise direction is obtained.

(2) Intermediate Heat Treatment after Lengthwise Drawing

As described above, in order for "molecules not contributed to shrinkage force while being oriented in the longitudinal direction" to be present in a film, it is preferable to thermally relax molecules oriented in the longitudinal direction, but conventionally, in biaxial drawing of a film, between the first-axial drawing and the second-axial drawing, when a film is subjected to heat treatment at high temperature, the film is crystallized after heat treatment, so that the film cannot be drawn more, this fact was the technical common knowledge in the art. However, the present inventors have had a trial and error, and as a result, a surprising fact has been found out as follows; in a lengthwise-transverse drawing method, lengthwise drawing is conducted in a certain constant condition, an intermediate heat treatment is conducted in a predetermined condition with adjusting to the state of the film after the lengthwise drawing, and furthermore, with adjusting to the state of the film after the intermediate heat treatment, transverse drawing is conducted in a predetermined condition, thereby without causing breakage in the transverse drawing, to be able to make "molecules not contributed to shrinkage force while being oriented in the longitudinal direction" present in the film.

Namely, in the production of the film by a lengthwise-transverse drawing method in the second invention, after an undrawn film is lengthwisely drawn, under a state that both edges in the width direction are held by clips in a tenter, it is preferable to conduct heat treatment (hereinafter called intermediate heat treatment) at a temperature of 110° C. or more and 150° C. or less for 5 second or more and 30 seconds or less. By conducting such intermediate heat treatment, it becomes possible that "molecules not contributed to shrinkage force while being oriented in the longitudinal direction" can be present in a film, from which it becomes possible to obtain a film in which perforation-opening property are good as a label and no irregularity of shrinkage generates. Even in the case where any lengthwise drawing is conducted, "molecules not contributed to shrinkage force while being oriented in the longitudinal direction" cannot be necessarily to be present in a film, but by conducting the foregoing predetermined low ratio lengthwise drawing, it becomes possible that "molecules not contributed to shrinkage force while being oriented in the longitudinal direction" can be present in a film for the first time after intermediate heat treatment. Then, by conducting the following forced cooling and transverse drawing, it becomes possible to orient molecules to the width direction and exhibit shrinkage force in the width direction while maintaining "molecules not contributed to shrinkage force while being oriented in the longitudinal direction."

Additionally, the temperature of intermediate heat treatment is preferably 110° C. or more and 150° C. or less. When the lower limit of the temperature of intermediate heat treatment is less than 110° C., it is not preferable because a shrinkage force in the longitudinal direction of a film remains, and the shrinkage rate in the longitudinal direction of a film after drawing in the transverse direction becomes high. When the upper limit of the temperature of intermediate heat treatment is more than 150° C., it is not preferable because the film surface layer is roughened. Thus, the temperature of intermediate heat treatment is preferably 110° C. or more and 150° C. or less, more preferably 115° C. or more and 145° C. or less, and further preferably 120° C. or more and 140° C. or less. It is preferable to take the temperature of intermediate heat treatment into consideration to a certain extent according to the composition of raw materials and the drawing ratio in the lengthwise direction.

Additionally, the time of intermediate heat treatment is preferably 5 seconds or more and 30 seconds or less. In conducting the intermediate heat treatment for more than 30 seconds, the heat treatment can be done at a low temperature, but productivity becomes bad. In the case of less than 5 seconds, it is not preferable because a shrinkage force in the longitudinal direction of a film remains, and the shrinkage rate in the longitudinal direction of a film after drawing in the transverse direction becomes high. Thus, the time of intermediate heat treatment is preferably 5 seconds or more and 30 seconds or less, more preferably 7 seconds or more and 28 seconds or less, and further preferably 9 seconds or more and 26 seconds or less. It is preferable to take the time of intermediate heat treatment into consideration to a certain extent according to the composition of raw materials and the drawing ratio in the lengthwise direction.

In conducting the intermediate heat treatment as described above, it is preferable to adjust the condition of intermediate heat treatment so that the thermal shrinkage stress in the longitudinal direction of a film after intermediate heat treatment is 0.5 MPa or less. By conducting the intermediate heat treatment under such a predetermined condition, it becomes possible to control the degree of orientation in the longitudinal and width directions of a film, and the degree of molecular tension in the transverse drawing and final heat treatment, and consequently, it becomes possible to make perforation-opening property of a final film good.

(3) Forced Cooling of the Film after Intermediate Heat Treatment

In production of a film by the lengthwise-transverse drawing method in the second invention, as described above, the film after intermediate heat treatment is not transversely drawn as it is, but it is preferable that a temperature of the film is quenched to be 70° C. or more and 90° C. or less. By conducting such quenching treatment, it becomes possible to obtain a film with good perforation-opening property as a label. The lower limit of the temperature of the film after quenching is preferably 72° C. or more, and more preferably 74° C. or more. Further, the upper limit of the temperature of the film after quenching is preferably 85° C. or less, and more preferably 80° C. or less.

As described above, in quenching a film, when the temperature of the film after quenching keeps exceeding 90° C., shrinkage ratio in the width direction of the film becomes low and shrinkage becomes insufficient as a label, but by controlling the temperature of the film after quenching at 90° C. or less, it becomes possible to maintain shrinkage ratio in the width direction of the film high.

Further, in quenching a film, when the temperature of the film after keeps continues exceeding 90° C., stress of transverse drawing carried out after cooling becomes small, and irregularity of thickness in the width direction tends to become large, but by quenching a temperature of the film after cooling to be 90° C. or less, it becomes possible to increase the stress of transverse drawing carried out after cooling and to reduce the irregularity of thickness in the width direction.

In addition, in quenching a film, when the temperature of the film after quenching keeps continues less than 70° C., stress of drawing becomes large, breakage of the film tends to occur. Therefore temperature of the film after cooling is preferably not less than 70° C. and not more than 90° C. or less, and more preferably not less than 72° C. and not more than 85° C., and further preferably not less than 74° C. and not more than 80° C.

(4) Control of Transverse Drawing Condition

In production of a film by the lengthwise-transverse drawing method in the second invention, it is preferable to transversely drawing a film in a predetermined condition after lengthwise drawing, intermediate heat treatment and quenching. Namely, the transverse drawing is preferable to be carried out such that the ratio becomes 3.5 times or more and 5.0 times or less at a temperature of 65° C. or more and 90° C. or less, in a state that both edges in the width direction are held by clips in a tenter. By conducting the transverse drawing in such a predetermined condition, it becomes possible to orient molecules to the width direction and exhibit shrinkage force in the width direction while maintaining "molecules not contributed to shrinkage force while being oriented in the longitudinal direction" formed by lengthwise drawing and intermediate heat treatment. By adopting the lengthwise-transverse drawing method, it is possible to provide an area drawing ratio larger than that of a simple monoaxially-drawn heat-shrinkable film with voids, and to further improve perforation-opening property. This improvement of perforation-opening property shows a good association with lowering of right-angle tear strength. Additionally, the lower limit of the temperature of transverse drawing is preferably 67° C. or more, further preferably 70° C. or more. The upper limit of the temperature of transverse drawing is more preferably 85° C. or less, more preferably 80° C. or less. On the other hand, the lower limit of the ratio of transverse drawing is preferably 3.6 times or more, more preferably 3.7 times or more. The upper limit of the ratio of transverse drawing is preferably 4.9 times or less, more preferably 4.8 times or less. It is preferable to adopt the lengthwise-transverse drawing method and make an area drawing ratio larger than that in the conventional monoaxially-drawing method, from the viewpoint of obtaining a lower apparent density.

When the drawing temperature exceeds 90° C., the shrinkage rate in the longitudinal direction becomes high, and the shrinkage rate in the width direction tends to be low, but by controlling the drawing temperature at 90° C. or less, the shrinkage rate in the longitudinal direction is suppressed, and also the shrinkage rate in the width direction is easily kept high, which is preferable.

Further, when drawing temperature exceeds 90° C., there is a tendency that irregularity of thickness in the width direction becomes large, but by controlling the drawing temperature at 90° C. or less, it becomes possible to reduce the irregularity of thickness in the width direction.

On the other hand, when drawing temperature is less than 65° C., orientation to the width direction becomes too high, breakage tends to occur in transverse drawing, but by controlling the drawing temperature at 65° C. or more, it becomes possible to reduce the breakage in transverse drawing.

[Influence of Interaction in Production Process on Film Properties]

In production of a heat-shrinkable white polyester film of the second invention, it is considered that by conducting all of the lengthwise drawing step, the intermediate heat treatment step, the forced cooling step and the transverse drawing step in appropriately controlled conditions as mentioned above, it becomes possible to make film properties very efficiently good. Further, among the film properties, the important properties such as right-angled tear strength in the longitudinal direction, irregularity of thickness in the width direction, irregularity of thickness in the longitudinal direction and solvent adhesive strength greatly vary in the values depending on interactions of a plurality of specific steps each other.

Namely, in the heat-shrinkable white polyester film of the second invention, right-angled tearing strength in the longitudinal direction is preferably adjusted to 200 N/mm or more and 300 N/mm or less, more preferably 290 N/mm or less, further preferably 280 N/mm or less. Controlling conditions in lengthwise drawing step and intermediate heat treatment step is very important to the right-angled tearing strength in the longitudinal direction.

Further, in the heat-shrinkable white polyester film of the second invention, irregularity of thickness in the width direction is preferably adjusted to 1% or more and 18% or less, and controlling conditions in lengthwise drawing step, intermediate heat treatment step and transverse drawing step is very important to the irregularity of thickness in the width direction.

Furthermore, in the heat-shrinkable white polyester film of the second invention, irregularity of thickness in the longitudinal direction is preferably adjusted to 1% or more and 18% or less, and controlling conditions in lengthwise drawing step and intermediate heat treatment step is very important to the irregularity of thickness in the width direction.

Regarding the heat-shrinkable white polyester film of the second invention, it is preferable to adjust solvent adhesive strength to 2 N/15 mm or more and 10 N/15 mm or less. The large factor of solvent adhesive strength is the degree of amorphous raw material ratio in the film surface, when the amorphous raw material ratio is large, there is a tendency that solvent adhesive strength becomes large. For example, in the following examples, when the amorphous raw material ratio in the film surface is 40% by mass or more, it is easy that solvent adhesive strength is 2 N/15 mm or more, which is preferable. However, when the amorphous raw material ratio is too large, there is a case where heat shrinkage properties become too large, and therefore it is preferably 95% by mass or less. Generally, given that the total of one or more monomer components capable of forming an amorphous component contained in 100% by mole of polyhydric alcohol component in a polyester resin of the film surface is expressed in % by mole of amorphous monomer, when it is set to 10% by mole or more, it is easy that solvent adhesive strength is 2 N/15 mm or more, which is preferable. It is further preferably set to 13% by mole or more of the film surface, and it is furthermore preferably set to 20% by mole or more of the film surface, but when it is too large, there is a case where heat shrinkage properties become too large, and therefore it may be 50% by mole or less, it is preferably 40% by mole or less, and further preferably 30% by mole or less.

In the first invention and the second invention, apparent density of a film is preferably 1.2 g/cm$^3$ or less, more preferably 1.18 g/cm$^3$ or less, and further preferably 1.16 g/cm$^3$ or less. It is a large advantage in mass production to be low in apparent density and lightweight, and the heat-shrinkable white polyester films of the first invention and the second invention have voids internally, and therefore can realize a preferable lightweight property. In particular, by adopting the following lengthwise-transverse drawing method, in comparison with the conventional monoaxially-drawn film having voids, a large area drawing ratio can be adopted, and a further low apparent density can be obtained. However, when the apparent density is too low, the strength of a film itself will deteriorate, and therefore the apparent density is preferably 0.6 g/cm$^3$ or more, and further preferably 0.7 or more.

In the first invention and the second invention, the whole light transmittance is 40% or less, preferably 35% or less, more preferably 30% or less, and further preferably 20% or less. When it exceeds 40%, there is an inferior case in appearance such that contents are seen through, or the printed material is hardly seen, which is not rather preferable. In the first invention and the second invention, the whiteness is 70 or more, preferably 75 or more, and more preferably 80 or more. When it is less than 70, there is an inferior case in appearance such that contents are seen through, or the printed material is hardly seen, which is not rather preferable.

The films obtained in the first invention and the second invention can be made tubular and jointed at the film ends. For jointing, it is preferable that 1,3-dioxolan or a mixed liquid with an organic solvent compatible with 1,3-dioxolan, or a solvent or swelling agent having a solubility parameter in a range of 8.0 to 13.8 is applied, and before drying, the film is jointed at a temperature of 70° C. or less to obtain a tubular body, and the body is bonded at its ends. As the solubility parameter, for example, those described in Solvent Handbook (edited by The Adhesion Society of Japan, published by The Nikkan Kogyo Shimbun, Ltd.) or the like are listed. The joint part in the tube may be a part in which the joint width is from as narrow as possible to as wide as 50 mm or more, and as a matter of course, it is suitably determined according to the size of containers, and in an ordinary kind thereof, a width of 1 to 5 mm is a standard. The joint part may be jointed in one line, or a plurality of linear joints may be formed over two lines or more. Since these joint parts hardly damage a film base material, the properties of a polyester-based polymer maintains as it is, and it has not only protective properties such as impact resistance and pot breakage resistance, but also has no deterioration in degree of orientation due to heat shrinkage or no embrittlement phenomenon due to heat treatment thereafter, which is good.

As a material mounted using this tube, there are a container, a pot (including plastic bottle), and a can/rod-like material (pipe, bar, wood, various rod-like bodies), preferably, by being mounted on a bottle made mainly of polyethylene terephthalate, recovery becomes easy, and in reuse of the polyethylene terephthalate bottle, even when a trace amount is mixed in a bottle raw material, this is effective because of being hardly colored.

The package used the film of the first invention and the second invention, is a package in which a label provided with perforations using the foregoing heat-shrinkable polyester film as a base material is coated at least on a part of the outer circumference and heat-shrunk, and as an object of the package, to start with PET bottles for beverage, various kinds of pots and cans, plastic containers for confectionary or lunch bag etc., paper box and the like can be listed (hereinafter, these are collectively referred to as a packaging object). In general, in the case where a label using a heat-shrinkable white polyester film as a base material is coated on the packaging object and heat-shrunk, the label is heat-shrunk by about 2 to 15% and closely attached on the package. Additionally, a label coated on a packaging object may be printed or may not be printed.

A method for producing a label is as follows; an organic solvent is applied on the inside slightly from the end part of one surface of a rectangular film, the film is immediately rounded to stack the end parts and bonded into a label-form, or an organic solvent is applied on the inside slightly from the end part of one surface of a film wound as a roll, the film is immediately rounded to stack the end parts and bonded into a tube-form, which is cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

Then, a label invention that is the third invention of the present invention is described. The label of the third invention is a label using the heat-shrinkable white polyester film such that the first and second inventions as a base material is coated at least on a part of the outer circumference and heat-shrunk, and as an object of the package, to start with PET bottles for beverage, various kinds of pots and cans, plastic containers for confectionary or lunch bag etc., paper box and the like can be listed (hereinafter, these are collectively referred to as a packaging object). In general, in the case where a label using a heat-shrinkable white polyester film as a base material is coated on the packaging object and heat-shrunk, the label is heat-shrunk by about 2 to 15% and closely attached on the package. Additionally, a label coated on a packaging object may be printed or may not be printed, and a perforations or notch may be provided in the direction orthogonal to the main shrinkage direction of the label.

In the case that an object to be packaged is covered with the label, there can be adopted a method that after a tubular body is formed previously for the main shrinkage direction so as to be the circumferential direction, the object to be packaged is covered with the tubular body and the tubular body is thermally shrunk, and in the case of forming such a tubular body, other than a method of bonding a heat-shrinkable white film by using various types of adhesives, it is possible to utilize a method that a heat-shrinkable white film is melt-bonded to adhere using a high-temperature heating element (melt-cut sealing method) and the like. Additionally, in the case that a heat-shrinkable film is subjected to melt-cut sealing, using a predetermined automatic bag-making machine (for example, RP500 manufactured by Kyoei Corporation), after a temperature and an angle of a melt-cut blade are adjusted to a predetermined condition (for example, temperature of melt-cut blade=240° C., blade angle=70°), a method for forming a tubular body or a bag at a predetermined speed (for example, 100 pieces/min) or the like can be adopted. In addition, in the case that an object to be packaged is covered with a label, it is possible to adopt a method where the label is wound around the periphery of the object to be packaged and by melt-cut sealing of the overlapped part, the periphery of an object to be packaged is covered with the label and then the label is thermally shrunk.

On the other hand, as a heat-shrinkable white film for label formation, there can be listed a heat-shrinkable white film made from various types of plastics, such as a heat-shrinkable white polyester film, a heat-shrinkable white polystyrene film, a heat-shrinkable white polyolefin film and a heat-shrinkable white polyvinylchloride film, among these, using a heat-shrinkable white polyester film is preferable because heat resistance of a label becomes high and solvent resistance of a label becomes good, and also a label can be easily incinerated. Hence, the following will be mainly described with regard to a heat-shrinkable white polyester film.

When a label of the present invention is measured for a right-angled tear strength per unit thickness of a label covered (film base material except for a printing layer) in the direction orthogonal to the main shrinkage direction by the following method, the right-angled tear strength is preferably not less than 90 N/mm and not more than 300 N/mm. Herein, a label is shrunk by heat treatment and attached on an object to be packaged, thus the label itself does not have so large heat-shrinkable property as a label before heat shrinkage treatment, but the direction that the label has been mainly shrunk upon attaching the label is referred to as the main shrinkage direction (hereinafter, the same description regarding the label).

[Measuring Method of Right-Angled Tear Strength]

In the case that the label was provided with printing, a printing layer was wiped out by a cloth soaked with ethyl acetate. A label not provided with printing or a label that a printing layer was removed is sampled as a specimen with a predetermined size in accordance with JIS-K-7128. Thereafter, both edges of the specimen are held by a universal tensile tester (for example, Autograph manufactured by Shimadzu Corporation) and strength at tensile break in the direction orthogonal to the main shrinkage direction of the label is measured in a condition of 200 mm/min in tensile speed. Then, right-angled tear strength per unit thickness is calculated using the following Equation 3.

$$\text{Right-angled tear strength} = \text{strength at tensile break} / \text{thickness} \qquad \text{Equation 3}$$

When the right-angled tear strength in the direction orthogonal to the main shrinkage direction of a label is less than 90 N/mm, a situation in which a film is easily torn by an impact such as falling during transportation is possibly caused, whereby the case is unpreferred, conversely, when the right-angled tear strength is more than 300 N/mm, it is not preferable because cutting property (easiness of tearing) become bad at an early stage of tearing a label. The lower limit value of the right-angled tear strength is preferably 110 N/mm or more, more preferably 130 N/mm or more, and furthermore preferably 150 N/mm or more. Further, the upper limit value of the right-angled tear strength is preferably 290 N/mm or less, more preferably 270 N/mm or less, further preferably 250 N/mm or less, further more preferably 200 N/mm or less, and particularly preferably 170 N/mm or less.

When a label of the present invention is measured for a tensile break strength of a label covered (film base material except for a printing layer) in the film longitudinal direction by the following method, the tensile break strength is preferably not less than 50 MPa and not more than 250 MPa.

[Measuring Method of Tensile Break Strength]

In the case that the label was provided with printing, a printing layer was wiped out by a cloth soaked with ethyl acetate. A specimen of a label not provided with printing or a label that a printing layer was removed with a predetermined size is produced in accordance with JIS-K-7127, both edges (in the film longitudinal direction) of the specimen are held by a universal tensile tester (for example, Autograph manufactured by Shimadzu Corporation) and a tensile test was carried out in a condition of 200 mm/min in tensile speed, stress value at tensile break is calculated as tensile break strength.

When the tensile break strength in the direction orthogonal to the main shrinkage direction of a label (film longitudinal direction) is less than 50 MPa, there occurs such a defect that processing of a film by applying tension to the film in the longitudinal direction, such as printing of the film, in the formation of a label from the film may easily cause breaking of the film. The lower limit value of the tensile break strength is preferably 90 MPa or more, more preferably 130 MPa or more, further preferably 160 MPa or more, and particularly preferably 190 MPa or more. The upper limit is suitably 250 MPa or less, and may be 240 MPa or less.

In the present invention, the apparent density of a label is preferably 1.20 g/cm$^3$ or less, more preferably 1.15 g/cm$^3$ or less, further preferably 1.12 g/cm$^3$ or less, and particularly preferably 1.10 g/cm$^3$ or less. It is a large advantage in mass production to be low in apparent density and lightweight, and a label obtained from a lightweight film having voids internally can realize a preferable lightweight property. However, when the apparent density is too low, the strength of a label itself will deteriorate, and therefore the apparent density is preferably 0.6 g/cm$^3$ or more, and further preferably 0.7 g/cm$^3$ or more.

The label of the third invention using the foregoing heat-shrinkable white polyester film as a base material is coated at least on a part of the outer circumference and heat-shrunk, and as an object of the package, to start with PET bottles for beverage, various kinds of pots and cans, plastic containers for confectionary or lunch bag etc., paper box and the like can be listed (hereinafter, these are collectively referred to as a packaging object). In general, in the case where a label using a heat-shrinkable white polyester film as a base material is coated on the packaging object and heat-shrunk, the label is heat-shrunk by about 2 to 15% and closely attached on the package. Additionally, a label coated on a packaging object may be printed or may not be printed.

A method for producing a label is as follows; an organic solvent is applied on the inside slightly from the end part of one surface of a rectangular film, the film is immediately rounded to stack the end parts and bonded into a label-form, or an organic solvent is applied on the inside slightly from the end part of one surface of a film wound as a roll, the film is immediately rounded to stack the end parts and bonded into a tube-form, which is cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

EXAMPLES

Hereinafter, the present invention is described in more detail by Examples, but the present invention is by no means limited to aspects of the Examples, and it can be suitably modified in the range not departing from the scope of the present invention.

Evaluation methods of films are as follows.
[Heat Shrinkage (Hot-Water Heat Shrinkage)]

A film was cut into a square of 10 cm×10 cm, treated and heat-shrunk in no load state for 10 seconds in hot water at a predetermined temperature ±0.5° C., and then the dimensions of the film in the lengthwise and transverse directions were measured, and heat shrinkage each was obtained according to the following Equation 1. The direction with the larger heat shrinkage was defined as a main shrinkage direction.

Heat shrinkage={(length before shrinkage−length after shrinkage)/length before shrinkage}×100 (%)  Equation 1

[Maximum Value of Heat Shrinkage Stress]

A film was cut into a size of a main shrinkage direction (width direction)×a direction orthogonal to the main shrinkage direction (longitudinal direction)=200 mm×15 mm. Thereafter, after a universal tensile tester STM-50 manufactured by Baldwin Corporation was adjusted to a temperature of 90° C., the cut film was set thereto, and a stress value in the main shrinkage direction when held for 10 seconds was measured.

[Right-Angled Tear Strength]

After a film was shrunk by 10% in the main shrinkage direction in hot water adjusted at 80° C., in accordance with JIS-K-7128, a specimen was produced by sampling in a shape shown in FIG. 1 (additionally, in sampling, longitudinal direction of the specimen was defined as the main shrinkage direction). Thereafter, both edges of the specimen were held by a universal tensile tester, the specimen was measured for strength at tensile break in a condition of tensile speed 200 mm/min, and the right-angled tear strength per unit thickness was calculated using the following Equation 2.

Right-angled tear strength=strength at tensile break/thickness  Equation 2

[Tensile Breaking Strength]

A rectangular specimen with a predetermined size is produced in accordance with JIS-K-7113, both edges of the specimen are held by a universal tensile tester and a tensile test was carried out in a condition of 200 mm/min in tensile speed, strength (stress) at tensile break in the longitudinal direction of film is calculated as tensile breaking strength.

[Whiteness]

It was measured by a whiteness JIS-L1015-1981-B method using Z-1001DP manufactured by Nippon Denshoku Industries Co., Ltd.

[Whole Light Transmittance]

The whole light transmittance was determined by NDH-1001DP manufactured by Nippon Denshoku Industries Co., Ltd.

[Irregularity of Thickness in Width Direction]

A film was sampled to a wide strip shape of 40 mm length× 1.2 m width, and by using a continuous contact thickness indicator manufactured by Micron Measurement Device Co., Ltd., thickness was continuously measured at a speed of 5 (m/min) along the width direction of the film sample (measuring length of 500 mm). At measurement, the maximum thickness, the minimum thickness and the average thickness were defined as Tmax., Tmin. and Tave., respectively, and the irregularity of thickness of the film in the longitudinal direction was calculated from the following Equation 4.

Irregularity of thickness={(Tmax.−Tmin.)/Tave.}×100 (%)—Equation 4

[Irregularity of Thickness in Longitudinal Direction]

A film was sampled in a long roll of 12 m length×40 mm width, and by using a continuous contact thickness indicator manufactured by Micron Measurement Device Co., Ltd, thickness was continuously measured at a speed of 5 (m/min) along the longitudinal direction of the film sample (measuring length of 10 m). At measurement, the maximum thickness, the minimum thickness and the average thickness were written as Tmax., Tmin. and Tave., respectively, and the irregularity of thickness of the film in the longitudinal direction was calculated from the above-described Equation 4.

[Solvent Adhesive Strength]

1,3-Dioxolan was applied on a drawn film, and two pieces were bonded to seal. Thereafter, the seal part was cut into a width of 15 mm in the direction orthogonal to the main shrinkage direction of the film (hereinafter called orthogonal direction), which was set to a universal tensile tester STM-50 manufactured by Baldwin Corporation, and a 180° peel test was carried out in a condition of tensile speed 200 mm/min. Then, the tensile strength at that time was defined as the solvent adhesive strength.

[Dynamic Friction Coefficient]

In accordance with JIS-K-7125, dynamic friction coefficient μd was obtained when the front surface and the rear surface of the film were contacted under an atmosphere at 23° C. and 65% RH using a tensile tester (Tensilon manufactured by ORIENTEC Co., Ltd.). The weight of a thread (weight) in which the upper side film was wound was 1.5 kg, and the base area of the thread was 63 mm lengthwise×63 mm transverse. Further, the tensile speed in the measurement of friction was 200 mm/min.

[Tg (Glass Transition Point)]

Using a differential scanning calorimeter manufactured by Seiko Instruments Inc. (model: DSC220), 5 mg of an undrawn film was heated at a heating-up speed of 10° C./min from −40° C. to 120° C., Tg was obtained from the thus obtained endothermic curve. Tangent lines were drawn in front of and behind the inflection point of the endothermic curve, and the intersection was defined as Tg (glass transition point).

[Apparent Density of Film]

A film was cut into four pieces each with a square of 5.0 cm as a sample. Four pieces of this sample were stacked, and the average of whole thicknesses was obtained by measuring the whole thickness at 10 different places in four significant figures using a micrometer. This average was divided by 4, which was rounded in three significant figures as an average thickness per one piece t (μm). The mass w (g) of four pieces of the same sample was measured in four significant figures using an automatic top-loading balance, and the apparent density was determined by the following Equation 5. Additionally, the apparent density was rounded in three significant figures.

$$\text{Apparent density}(g/cm^3) = w/(5.0 \times 5.0 \times t \times 10^{-4} \times 4) = w \times 100/t \quad \text{Equation 5}$$

[Molecular Orientation Ratio]

A sample of a film in longitudinal direction×width direction=140 mm×100 mm was obtained. Then, the sample was measured for a molecular orientation ratio (MOR) using a molecular orientation angle measuring instrument (MOA-6004) manufactured by Oji Scientific Instruments Co., Ltd.

[Shrinkage Finish Property]

On a heat-shrinkable film, a three color-printing with green, gold and white ink of Toyo Ink Mfg Co., Ltd. was provided previously. By bonding both end parts of the printed film with dioxolan, a cylindrical-form label (label in which main shrinkage direction of the heat-shrinkable film was the circumferential direction) was produced. Thereafter, using a steam tunnel manufactured by Fuji Astec, Inc. (model: SH-1500-L), the label was attached by heat shrinkage on a PET bottle of 500 ml (trunk diameter 62 mm, minimum diameter of neck part 25 mm) at a zone temperature of 80° C. with a passing time of 2.5 seconds. In attachment, the neck part was adjusted such that the part of diameter 40 mm was placed on one edge of the label. The evaluation of finish property after shrinkage was carried out visually, and the criteria were as follows.

Excellent: no wrinkle, jumping up and lack of shrinkage occurs, and no irregularity of color is observed.

Good: wrinkle, jumping up or lack of shrinkage cannot be observed, but some irregularity of color is observed.

Fair: no jumping up and lack of shrinkage occurs, but irregularity of neck part is observed.

Poor: wrinkle, jumping up and lack of shrinkage occur.

[Shrinkage Strain of Label]

By bonding both ends of a heat-shrinkable film with dioxolan, a cylindrical label (a label setting the main shrinkage direction of a heat-shrinkable film to the peripheral direction) was produced. Thereafter, using a steam tunnel (type: SH-1500-L) manufactured by Fuji Astec Inc., the label was mounted on a PET bottle of 500 ml (diameter 62 mm, minimum diameter of neck part 25 mm) by heat shrinkage at a zone temperature of 80° C. with a passing time of 2.5 seconds. Additionally, upon mounting, adjustment was done so that the part having a diameter of 40 mm was set to one end of the label in the neck part. As the evaluation of finish after shrinkage, strain in a 360 degree direction of the upper part of the label mounted was measured using a gauge to obtain the maximum of strain. In this time, the following was used as a standard.

Good: maximum strain less than 2 mm

Poor: maximum strain 2 mm or more

[Label Adhesiveness]

A label was attached in the same condition as in the foregoing measuring condition of shrinkage finish property. Then, when the label attached and PET bottle were lightly twisted, it was "good" in the case of no movement of label, and "poor" in the case of slide or out of alignment of the label and bottle.

[Perforation-Opening Property]

A label to which perforations were previously provided in the direction orthogonal to the main shrinkage direction was attached on a PET bottle in the same condition as in the foregoing measuring condition of shrinkage finish property. The perforation was formed by providing a hole of 1 mm long in the intervals of 1 mm, and two lines of perforations were provided in width 22 mm and length 120 mm in the lengthwise direction of the label (height direction). Thereafter, this bottle was filled with 500 ml of water, cooled at 5° C., and perforations of the label of the bottle immediately after taking it out from a refrigerator were torn with fingertips, and the number of bottles cleanly torn along the perforations in the lengthwise direction thereby to be able to remove the label from the bottle was counted, and a ratio (%) relative to the total samples of 50 was calculated.

The evaluation method of a label after covering is as follows.

[Measuring Method of Tensile Break Strength]

A label attached on an object to be packaged was peeled, in the case that the label was provided with printing, a printing layer was wiped out by a cloth soaked with ethyl acetate. A label not provided with printing or a label that a printing layer was removed was sampled, according to JIS-K-7127, into a rectangle test piece of 50 mm long in the direction orthogonal to the main shrinkage direction (film longitudinal direction, perforation direction of general label) by 20 mm long in the main shrinkage direction (film width direction), using a universal tensile tester (Autograph manufactured by Shimadzu Corporation), both ends of the test piece (both ends in the long direction) were clamped, a tensile test was conducted under the condition of 200 mm/min in tensile speed, and a stress value at break was calculated as a tensile break strength.
[Right-Angled Tear Strength]

A label attached on an object to be packaged was peeled, in the case that the label was provided with printing, a printing layer was wiped out by a cloth soaked with ethyl acetate. Using a label not provided with printing or a label that a printing layer was removed, according to JIS-K-7128, a specimen was produced by sampling in a shape shown in FIG. 2. The main shrinkage direction was defined as longitudinal direction (width direction of film; orthogonal to perforation direction of general label) of the specimen. Thereafter, both edges of the specimen were held by a universal tensile tester (Autograph manufactured by Shimadzu Corporation), the specimen was measured for strength at tensile break in the main shrinkage direction in a condition of tensile speed 200 mm/min, and the right-angled tear strength per unit thickness was calculated using the above Equation 2.
[Whiteness]

In the case that the label was provided with printing, a printing layer was wiped out by a cloth soaked with ethyl acetate. A label not provided with printing or a label that a printing layer was removed was sampled, whiteness was measured by JIS-L1015-1981-B method using Z-1001DP manufactured by Nippon Denshoku Industries Co., Ltd.
[Whole Light Transmittance]

In the case that the label was provided with printing, a printing layer was wiped out by a cloth soaked with ethyl acetate. A label not provided with printing or a label that a printing layer was removed was sampled, the whole light transmittance was determined by NDH-1001DP manufactured by Nippon Denshoku Industries Co., Ltd.

[Apparent Density]

In the case that the label was provided with printing, a printing layer was wiped out by a cloth soaked with ethyl acetate. A label not provided with printing or a label that a printing layer was removed was sampled. The label was cut into four pieces each with a square of 5.0 cm as a sample. Four pieces of this sample were stacked, and the average of whole thicknesses was obtained by measuring the whole thickness at 10 different places in four significant figures using a micrometer. This average was divided by 4, which was rounded in three significant figures as an average thickness per one piece t (μm). The mass w (g) of four pieces of the same sample was measured in four significant figures using an automatic top-loading balance, and the apparent density was determined by the following Equation 5.
[Opening Rate in Dropping]

Water (500 ml) was filled in an object to be packaged such as a PET bottle on which a label was attached, after the PET bottle was left in a refrigerator adjusted at about 5° C. for 8 hours or more, it was dropped from a height of 1 m in such a manner that the part provided with a perforation was downward, and the ratio (%) of one that the perforation was torn was calculated (n=100).
[Shrinkage Finish Property]

The evaluation of finish property of label attached around an object to be packaged was carried out visually, and the criteria were as follows.

Excellent: no wrinkle, jumping up and lack of shrinkage occurs, and no irregularity of color is observed.

Good: wrinkle, jumping up or lack of shrinkage cannot be observed, but some irregularity of color is observed.

Fair: no jumping up and lack of shrinkage occurs, but irregularity of neck part is observed.

Poor: wrinkle, jumping up and lack of shrinkage occur.
[Label Adhesiveness]

When the label attached and an object to be packaged were lightly twisted, it was "good" in the case of no movement of label, and "poor" in the case of slide or out of alignment of the label and bottle.
[Perforation-Opening Property]

Water (500 ml) was filled in an object to be packaged such as a PET bottle on which a label was attached, and then the PET bottle was cooled at 5° C. Thereafter, perforations of the label of the bottle immediately after taking it out from a refrigerator were torn with fingertips, and the number of bottles cleanly torn along the perforations in the lengthwise direction thereby to be able to remove the label from the bottle was counted, and a ratio (%) relative to the total samples of 50 was calculated.

Properties and compositions of polyester raw materials used in Examples 1-7 related to the first invention and Comparative Examples 1-2 and production conditions of films (drawing, heat treatment condition etc.) in Examples and Comparative Examples are shown in Table 1 and Table 2, respectively.

TABLE 1

| | Raw material composition of polyester (mole %) | | | | |
| --- | --- | --- | --- | --- | --- |
| | Dicarboxylic acid component | Polyhydric alcohol component | | | |
| | DMT | EG | NPG | CHDM | BD |
| Polyester A | 100 | 100 | — | — | — |
| Polyester B | 100 | 70 | 30 | — | — |
| Polyester C | 100 | 70 | — | 30 | — |
| Polyester D | 100 | — | — | — | 100 |

TABLE 2

| | Layer | Resin composition | Added mount of Polystyrene (wt %) | Added mount of Polypropylene (wt %) | Added mount of Titanium dioxide (wt %) | Amorphous component (mole %) | Amorphous component of whole film (mole %) |
| --- | --- | --- | --- | --- | --- | --- | --- |
| Example. 1 | X | A/B/D = 10:80:10 | 10 | 0 | 10 | 19.2 | 21.6 |
| | Y | A/B/D = 10:80:10 | 0 | 0 | 0 | 24 | |
| Example. 2 | X | A/B/D = 10:80:10 | 0 | 10 | 10 | 19.2 | 21.6 |
| | Y | A/B/D = 10:80:10 | 0 | 0 | 0 | 24 | |
| Example. 3 | X | A/B/C/D = 10:15:65:10 | 10 | 0 | 10 | 19.2 | 21.6 |
| | Y | A/B/C/D = 10:15:65:10 | 0 | 0 | 0 | 24 | |
| Example. 4 | X | A/C/D = 10:80:10 | 10 | 0 | 10 | 19.2 | 21.6 |
| | Y | A/C/D = 10:80:10 | 0 | 0 | 0 | 24 | |
| Example. 5 | X | A/B/D = 10:80:10 | 10 | 0 | 10 | 19.2 | 21.6 |
| | Y | A/B/D = 10:80:10 | 0 | 0 | 0 | 24 | |

TABLE 2-continued

| | | | | | | | |
|---|---|---|---|---|---|---|---|
| Example. 6 | X | A/B/D = 10:80:10 | 10 | 0 | 10 | 19.2 | 21.6 |
| | Y | A/B/D = 10:80:10 | 0 | 0 | 0 | 24 | |
| Example. 7 | X | A/B/D = 10:80:10 | 10 | 0 | 14 | 18.2 | 21.1 |
| | Y | A/B/D = 10:80:10 | 0 | 0 | 0 | 24 | |
| Comparative Example 1 | X | A/B/D = 10:80:10 | 10 | 0 | 10 | 19.2 | 21.6 |
| | Y | A/B/D = 10:80:10 | 0 | 0 | 0 | 24 | |
| Comparative Example 2 | X | A/B/D = 10:80:10 | 10 | 0 | 10 | 19.2 | 21.6 |
| | Y | A/B/D = 10:80:10 | 0 | 0 | 0 | 24 | |

Drawing condition

| | Lengthwise drawing | | | | Intermediate heat treatment (heat treatment after lengthwise drawing) | | Presence or absence of intermediate zone | Temperature of cooling step | Transverse drawing step | | Final heat treatment temperature (° C.) |
|---|---|---|---|---|---|---|---|---|---|---|---|
| | First drawing step | | Second drawing | | | | | | | | |
| | Temperature (° C.) | Ratio | Temperature (° C.) | Ratio | Total ratio | Temperature (° C.) | Time (sec) | | | Temperature (° C.) | Ratio | |
| Example. 1 | 78 | 2.6 | 95 | 1.4 | 3.64 | 160 | 5 | Presence | 100 | 95 | 4 | 85 |
| Example. 2 | 78 | 2.6 | 95 | 1.4 | 3.64 | 160 | 5 | Presence | 100 | 95 | 4 | 85 |
| Example. 3 | 78 | 2.6 | 95 | 1.4 | 3.64 | 160 | 5 | Presence | 100 | 95 | 4 | 85 |
| Example. 4 | 78 | 2.6 | 95 | 1.4 | 3.64 | 160 | 5 | Presence | 100 | 95 | 4 | 85 |
| Example. 5 | 78 | 2.9 | 95 | 1.4 | 4.06 | 170 | 8 | Presence | 100 | 95 | 4 | 85 |
| Example. 6 | 78 | 2.2 | 95 | 1.34 | 2.94 | 155 | 5 | Presence | 100 | 95 | 4 | 85 |
| Example 7 | 78 | 2.6 | 95 | 1.4 | 3.64 | 160 | 5 | Presence | 100 | 95 | 4 | 85 |
| Comparative Example 1 | 78 | 1 | 82 | 3.7 | 3.7 | 125 | 5 | Presence | 100 | 95 | 4 | 85 |
| Comparative Example 2 | Lengthwise drawing being not conducted | | | | Intermediate heat treatment and cooling being not conducted | | | | | 75 | 4 | 85 |

<Preparation of Polyester Raw Material>

Into an autoclave made of stainless steel equipped with a stirrer, a thermometer and a partial reflux condenser, 100 mol % of dimethyl terephthalate (DMT) as a dibasic acid component and 100 mol % of ethylene glycol (EG) as a glycol component were charged such that glycol became 2.2 times to methyl ester in mole ratio, and using 0.05 mol % (relative to acid component) of zinc acetate as an ester exchange catalyst, ester exchange reaction was conducted while distilling methanol generated out of the system. Thereafter, 0.025 mol % (relative to acid component) of antimony trioxide as a polycondensation catalyst was added thereto, polycondensation reaction was carried out at 280° C. under a reduced pressure of 26.6 Pa (0.2 torr). A polyester (A) of 0.70 dl/g in intrinsic viscosity was obtained. This polyester is polyethylene terephthalate. Further, in the same way as described above, polyesters (B, C, D) shown in Table 1 were synthesized. In the Table, NPG is neopentyl glycol, CHDM is 1,4-cyclohexanedimethanol, and BD is 1,4-butanediol. Regarding the intrinsic viscosity of each polyester, B was 0.72 dl/g, C was 0.80 dl/g and D was 1.15 dl/g. Each polyester was suitably made into chips.

Example 1

The above-described polyester A, polyester B and polyester D were mixed in a weight ratio of 10:80:10 to obtain a raw material for a Y layer. As a raw material for an X layer, upon mixing the polyester A, polyester B and polyester D in a weight ratio of 10:80:10 in the same manner as in the above, further, 10% by weight of a polystyrene resin (G797N, manufactured by Japan Polystyrene Inc.) and 10% by weight of titanium dioxide (TA-300, manufactured by Fuji Titanium Industry Co., Ltd.) were added thereto and mixed. The raw materials of an X layer and a Y layer were each charged in separate biaxial screw extruders and mixed, and the mixture melt was jointed in a feed block and then melt-extruded through a T-die at 280° C., wound around a rotating metal roll cooled at a surface temperature of 30° C. to quench, thereby obtaining an undrawn film having a thickness of 484 μm and a laminated structure of Y/X/Y (Y/X/Y=121 μm/242 μm/121 μm). The take-up speed (rotation speed of metal roll) of the undrawn film in this case was about 20 m/min. The Tg of the undrawn film was 67° C.

Then, the thus obtained undrawn film described above was introduced to a lengthwise drawing machine in which a plurality of rolls were continuously disposed, and drawn in the lengthwise direction in two steps by utilizing the difference of rotary speed of rolls. Namely, the undrawn film was preheated on a preheating roll until the film temperature became 78° C., and then drawn 2.6 times by utilizing the rotary speed difference between a low-speed rotary roll whose surface temperature was set at 78° C. and a medium-speed rotary roll whose surface temperature was set at 78° C. (lengthwise drawing of the first step). Furthermore, the lengthwisely drawn film was lengthwisely drawn 1.4 times by utilizing the rotary speed difference between a medium-speed rotary roll whose surface temperature was set at 95° C. and a high-speed rotary roll whose surface temperature was set at 30° C. (lengthwise drawing of the second step; accordingly, the total lengthwise drawing ratio was 3.64 times).

The film immediately after the lengthwise drawing as described above was forcedly cooled at a cooling speed of 40° C./sec by a cooling roll (high-speed roll positioned just behind the lengthwise drawing roll in the second step) whose surface temperature was set at 30° C., and then the film after cooling was introduced to a tenter, and continuously passed through an intermediate heat treatment zone, a first intermediate zone (natural cooling zone), a cooling zone (forced cooling zone), a second intermediate zone, a transverse drawing zone and a final heat treatment zone. In the tenter, the length of the first intermediate zone was set to about 40 cm, and shielding plates were each provided between the intermediate heat treatment zone and the first intermediate zone; between the first intermediate zone and the cooling zone; between the cooling zone and the second intermediate zone; and between the second intermediate zone and the transverse drawing zone. Furthermore, in the first intermediate zone and the second intermediate zone, hot wind from the intermediate heat treatment zone, cooling wind from the cooling zone and hot wind from the transverse drawing zone were shut off such that when a rectangular strip of paper is hung down in the vertical direction in a state that a film is not passed through, the strip of paper hangs down almost completely in the vertical direction. In addition, when a film passes through, the distance of the film and the shielding plate was adjusted such that the most part of associated air accompanied by movement of the film was shut off by the shielding plate provided between the intermediate heat treatment zone and the first intermediate zone. In addition, when a film passes through, in the boundary between the intermediate heat treatment zone and the first intermediate zone, and the boundary between the cooling zone and the second intermediate zone, the distance of the film and the shielding plate was adjusted such that the most part of associated air accompanied by movement of the film was shut off by the shielding plate.

Then, the lengthwisely drawn film introduced to the tenter was heat-treated at first in the intermediate heat treatment zone at a temperature of 160° C. for 5.0 seconds, and then the film after the intermediate heat treatment was introduced to the first intermediate zone, and subjected to natural cooling by passing it through the zone (passing time=about 1.0 second). Thereafter, the film after the natural cooling was introduced to the cooling zone, and actively cooled by blowing wind of low temperature until the surface temperature of the film became 100° C., the film after the cooling was introduced to the second intermediate zone, and subjected to natural cooling again by passing it through the zone (passing time=about 1.0 second). Further, the film after passing through the second intermediate zone was introduced to the transverse drawing zone, preheated until the surface temperature of the film became 95° C., and drawn 4.0 times in the width direction (transverse direction) at 95° C.

Thereafter, the film after the transverse drawing was introduced to the final heat treatment zone, heat-treated in the final heat treatment zone at a temperature of 85° C. for 5.0 seconds, and then cooled, both edge parts were cut and removed for winding a roll of width 500 mm. A biaxially drawn film of about 40 μm in a predetermined length was produced continuously. Then, properties of the film obtained were evaluated by the foregoing methods. The evaluation results are shown in Table 3.

Example 2

A heat-shrinkable white film was continuously produced by the same method as in Example 1 except that in place of 10% by weight of a polystyrene resin added in the raw material for an X layer in Example 1, 10% by weight of a crystalline polypropylene resin (FO-50F manufactured by Grand Polymer Co., Ltd.) was used. The properties of the film obtained were evaluated by the same method as in Example 1. The evaluation results are shown in Table 3. It was a good film like the film of Example 1.

Example 3

The above-described polyester A, polyester B, polyester C and polyester D were mixed in a weight ratio of 10:15:65:10 to obtain raw material polyesters for an X layer and a Y layer, and each was charged in an extruder. Upon mixing, only to the raw material for an X layer, in the same manner as in Example 1, 10% by weight of a polystyrene resin (G797N, manufactured by Japan Polystyrene Inc.) and 10% by weight of titanium dioxide (TA-300, manufactured by Fuji Titanium Industry Co., Ltd.) were added. Thereafter, each mixed resin was melt-extruded in the same condition as in Example 1 to form an undrawn film. The Tg of the undrawn film was 67° C. The undrawn film was formed into a film in the same condition as in Example 1, thereby continuously producing a biaxially drawn film of about 40 μm in 500 mm width. The properties of the film obtained were evaluated by the same method as in Example 1. The evaluation results are shown in Table 3.

Example 4

The above-described polyester A, polyester C and polyester D were mixed in a weight ratio of 10:80:10 to obtain raw material polyesters for an X layer and a Y layer, and each was charged in an extruder. Upon mixing, only to the raw material for an X layer, in the same manner as in Example 1, 10% by weight of a polystyrene resin (G797N, manufactured by Japan Polystyrene Inc.) and 10% by weight of titanium dioxide (TA-300, manufactured by Fuji Titanium Industry Co., Ltd.) were added. Thereafter, each mixed resin was melt-extruded in the same condition as in Example 1 to form an undrawn film. The Tg of the undrawn film was 67° C. The undrawn film was formed into a film in the same condition as in Example 1, thereby continuously producing a biaxially drawn film of about 40 μm in 500 mm width. The properties of the film obtained were evaluated by the same method as in Example 1. The evaluation results are shown in Table 3.

Example 5

An undrawn film having a laminated structure of Y/X/Y was obtained in the same manner as in Example 1 except that film thickness was changed to 532 μm (Y/X/Y=133 μm/266 μm/133 μm) by adjusting the discharge amount in Example 1. A biaxially drawn film of about 40 μm in 500 mm wide was continuously produced by film-forming the undrawn film in the same condition as in Example 1 except that the lengthwise drawing ratio of the first step was 2.9 times, total lengthwise drawing ratio was 4.06 times, and heat treatment was conducted at 170° C. for 8.0 seconds in the intermediate heat treatment zone. Then, properties of the film obtained were evaluated by the same way as in Example 1. The evaluation results are shown in Table 3.

Example 6

An undrawn film having a laminated structure of Y/X/Y was obtained in the same manner as in Example 1 except that film thickness was changed to 400 μm (Y/X/Y=100 μm/200 μm/100 μm) by adjusting the discharge amount in Example 1. A biaxially drawn film of about 40 μm in 500 mm wide was continuously produced by film-forming the undrawn film in the same condition as in Example 1 except that the lengthwise drawing ratio of the first step was 2.2 times, total lengthwise drawing ratio was 2.94 times, and heat treatment was conducted at 155° C. in the intermediate heat treatment zone. Then, properties of the film obtained were evaluated by the same way as in Example 1. The evaluation results are shown in Table 3.

Example 7

A biaxially drawn film of about 40 μm was continuously produced in 500 mm width by forming into a film in the same condition as in Example 1 except that the amount of titanium dioxide (TA-300 manufactured by Fuji Titanium Industry Co., Ltd.) to be added in an X layer in Example 1 was changed to 14% by weight. The properties of the film obtained were evaluated by the same method as in Example 1. The evaluation results are shown in Table 3.

Comparative example 1

Upon melt-extruding the same polyester raw material of Example 1 in the same manner as in Example 1, the discharge amount of an extruder was adjusted so as to be an undrawn film having a thickness of 480 μm and a laminated structure of Y/X/Y (Y/X/Y=120 μm/240 μm/120 μm). Except those described above, an undrawn film was obtained in the same manner as in Example 1. The undrawn film was subjected to lengthwise drawing of one step in 3.7 times by utilizing the rotation speed difference between a medium-speed rotating roll whose surface temperature was set at 82° C. and a high-speed rotating roll whose surface temperature was set at 30° C. Thereafter, a biaxially drawn film of about 40 μm was continuously produced in 500 mm width by providing the film with natural cooling, forced cooling, lateral drawing, and final heat treatment in the same manner as in Example 1 except that a temperature of 125° C. was given in intermediate heat treatment, and by cutting off both ends. The properties of the film obtained were evaluated by the same method as in Example 1. The evaluation results are shown in Table 3.

Comparative example 2

An undrawn film having a laminated structure of Y/X/Y was obtained in the same manner as in Example 1 except that film thickness was changed to 144 μm (Y/X/Y=36 μm/72 μm/36 μm) by adjusting the discharge amount in Example 1. The undrawn film was preheated until the film temperature became 75° C., was subjected to monoaxial transverse drawing at 75° C. by 4.0 times in the film width direction (transverse direction). Thereafter, the film after the transverse drawing was introduced to the final heat treatment zone, heat-treated in the final heat treatment zone at a temperature of 85° C. for 5.0 seconds, and then cooled, both edge parts were cut and removed for winding a roll of width 500 mm. A monoaxially drawn film of about 40 μm in a predetermined length was produced continuously. Then, properties of the film obtained were evaluated by the foregoing methods. The evaluation results are shown in Table 3.

TABLE 3

| | Properties of heat shrinkable film | | | | | | | | | |
|---|---|---|---|---|---|---|---|---|---|---|
| | Hot-water shrinkage (%) | | Right-angled tear strength (N/mm) | Tensile breaking strength (MPa) Orthogonal direction | Whiteness | Whole light transmittance (%) | Shrinkage stress (MPa) | Irregularity of thickness | | Solvent adhesive strength (N/15 mm) |
| | Width direction | Longitudinal direction | | | | | | Width direction | Longitudinal direction | |
| | 80° C. | 90° C. | 90° C. | | | | | | | |
| Example 1 | 45 | 54 | 2 | 140 | 210 | 86 | 28 | 7.2 | 8.2 | 9.5 | 5.2 |
| Example 2 | 44 | 55 | 2 | 150 | 220 | 86 | 29 | 7.4 | 8 | 8.8 | 5 |
| Example 3 | 43 | 54 | 2 | 150 | 215 | 86 | 28 | 7 | 7.8 | 9.5 | 5.9 |
| Example 4 | 44 | 54 | 1.5 | 150 | 210 | 86 | 28 | 6.3 | 8.6 | 7.5 | 6.6 |
| Example 5 | 43 | 54 | 2 | 110 | 240 | 87 | 27 | 8.2 | 9.5 | 6.5 | 4.4 |
| Example 6 | 43 | 55 | 1 | 190 | 170 | 84 | 30 | 6.9 | 6.5 | 8.5 | 5.5 |
| Example 7 | 41 | 50 | 2 | 135 | 190 | 92 | 28 | 7 | 8.8 | 9.8 | 5.2 |
| Comparative Example 1 | 44 | 52 | 16 | 160 | 210 | 86 | 28 | 7.5 | 8.5 | 9 | 5.7 |
| Comparative Example 2 | 45 | 53 | 1 | 320 | 60 | 82 | 33 | 6 | 8 | 8 | 6 |

| | Properties of heat-shrinkable film | | | | | | |
|---|---|---|---|---|---|---|---|
| | Dynamic friction coefficient | Apparent density (g/cm³) | Molecular orientation ratio(MOR) | Label adhesiveness | Shrinkage strain | Irregularity of roll | Defective fraction of perforation opening (%) |
| Example 1 | 0.47 | 1.10 | 1.3 | Good | Good | Good | 2 |
| Example 2 | 0.43 | 1.10 | 1.3 | Good | Good | Good | 2 |
| Example 3 | 0.41 | 1.11 | 1.4 | Good | Good | Good | 2 |
| Example 4 | 0.41 | 1.12 | 1.4 | Good | Good | Good | 2 |
| Example 5 | 0.43 | 1.08 | 1.2 | Good | Good | Good | 4 |
| Example 6 | 0.45 | 1.12 | 1.5 | Good | Good | Good | 4 |
| Example 7 | 0.47 | 1.11 | 1.3 | Good | Good | Good | 4 |
| Comparative Example 1 | 0.48 | 1.07 | 1.4 | Good | Fair | Good | 2 |
| Comparative Example 2 | 0.52 | 1.20 | 4.2 | Good | Good | Good | 30 |

As is clear from Table 3, all the films obtained in Examples 1 to 7 had a high shrinkage in the width direction being the main shrinkage direction, and a very low shrinkage in the longitudinal direction orthogonal to the main shrinkage direction. For all the films obtained in Examples 1 to 7, light shielding was sufficient, solvent adhesive strength was high, irregularity of thickness in the longitudinal direction, label adhesiveness was good when produced into a label, there was no irregularity of shrinkage, and perforation-opening property was good. Further, no wrinkle was generated in the film roll produced in Examples 1 to 7. Namely heat-shrinkable white polyester films obtained in Examples 1 to 7 were all excellent in quality as a label and very good in practical utility.

In contrast to that, the heat-shrinkable film obtained in Comparative Example 1 was high in heat shrinkage rate in the longitudinal direction, and unevenness of shrinkage occurred when produced into a label. The film obtained in Comparative Example 2 was large in the value of molecular orientation ratio (MOR), thus, the right-angle tear strength was large, the tensile break strength in the orthogonal direction (longitudinal direction) was small and perforation openness was not good. That is, the heat-shrinkable polyester films obtained in Comparative Examples were all inferior in quality as a label and poor in practical utility.

Next, polyesters used in Examples 8 to 15 related to the second invention and in Comparative Examples 3 to 4 are as follows.

Polyester 1: polyester (IV 0.72 dl/g) composed of ethylene glycol 70% by mole, neopentyl glycol 30% by mole and terephthalic acid Polyester 2: polyethylene terephthalate (IV 0.75 dl/g)

Polyester 3: polyester (IV 0.75 dl/g) composed of ethylene glycol 70% by mole, 1,4-cyclohexanedimethanol 30% by mole and terephthalic acid

TABLE 4

| | Layer | Polyester 1 | Polyester 2 | Polyester 3 | Added mount of Polystyrene (wt %) | Added mount of Polypropylene (wt %) | Added mount of Titanium dioxide (wt %) | Amorphous component (mole %) | Amorphous component of whole film (mole %) |
|---|---|---|---|---|---|---|---|---|---|
| Example. 8 | A | 72 | 8 | — | 10 | 0 | 10 | 21.6 | 24.3 |
| | B | 90 | 10 | — | 0 | 0 | 0 | 27.0 | |
| Example. 9 | A | 72 | 8 | — | 0 | 10 | 10 | 21.6 | 24.3 |
| | B | 90 | 10 | — | 0 | 0 | 0 | 27.0 | |
| Example. 10 | A | — | 8 | 72 | 10 | 0 | 10 | 21.6 | 24.3 |
| | B | — | 10 | 90 | 0 | 0 | 0 | 27.0 | |
| Example. 11 | A | 72 | 8 | — | 10 | 0 | 10 | 21.6 | 24.3 |
| | B | 90 | 10 | — | 0 | 0 | 0 | 27.0 | |
| Example. 12 | A | 72 | 8 | — | 10 | 0 | 10 | 21.6 | 24.3 |
| | B | 90 | 10 | — | 0 | 0 | 0 | 27.0 | |
| Example. 13 | A | 72 | 8 | — | 10 | 0 | 10 | 21.6 | 24.3 |
| | B | 90 | 10 | — | 0 | 0 | 0 | 27.0 | |
| Example. 14 | A | 72 | 8 | — | 10 | 0 | 10 | 21.6 | 15.3 |
| | B | 30 | 70 | — | 0 | 0 | 0 | 9.0 | |
| Example. 15 | A | 68.4 | 7.6 | — | 10 | 0 | 14 | 20.5 | 23.8 |
| | B | 90 | 10 | — | 0 | 0 | 0 | 27.0 | |
| Comparative Example 3 | A | 72 | 8 | — | 10 | 0 | 10 | 21.6 | 24.3 |
| | B | 90 | 10 | — | 0 | 0 | 0 | 27.0 | |
| Comparative Example 4 | A | 72 | 8 | — | 10 | 0 | 10 | 21.6 | 24.3 |
| | B | 90 | 10 | — | 0 | 0 | 0 | 27.0 | |

TABLE 5

| | Lengthwise drawing step | | Intermediate heat treatment (heat treatment after lengthwise drawing) | | Cooing step Temperature of film surface (° C.) | Transverse drawing step | | Final heat treatment temperature (° C.) |
|---|---|---|---|---|---|---|---|---|
| | Temperature (° C.) | Ratio | Temperature (° C.) | Time (sec) | | Temperature (° C.) | Ratio | |
| Example. 8 | 85 | 1.5 | 130 | 10 | 80 | 75 | 4 | 85 |
| Example. 9 | 85 | 1.5 | 130 | 10 | 80 | 75 | 4 | 85 |
| Example. 10 | 85 | 1.5 | 130 | 10 | 80 | 75 | 4 | 85 |
| Example. 11 | 85 | 1.1 | 125 | 10 | 80 | 75 | 4 | 85 |
| Example. 12 | 85 | 1.7 | 140 | 10 | 80 | 75 | 4 | 85 |
| Example. 13 | 85 | 1.5 | 130 | 10 | 90 | 75 | 4 | 85 |
| Example. 14 | 85 | 1.5 | 130 | 10 | 80 | 75 | 4 | 85 |
| Example. 15 | 85 | 1.5 | 130 | 10 | 80 | 75 | 4 | 85 |
| Comparative Example 3 | Lengthwise drawing being not conducted | | Intermediate heat treatment being not conducted | | Cooling being not conducted | 80 | 3.9 | 78 |
| Comparative Example 4 | 85 | 1.5 | 100 | 10 | 80 | 75 | 4 | 85 |

Example 8

The above-described polyester 1 and polyester 2 were mixed in a weight ratio of 90:10 to obtain raw material polyesters for a B layer. As a raw material for an A layer, upon mixing the polyester 1 and polyester 2 in a weight ratio of 90:10 in the same manner as in the above, further, 10% by weight of a polystyrene resin (G797N, manufactured by Japan Polystyrene Inc.) and 10% by weight of titanium dioxide (TA-300, manufactured by Fuji Titanium Industry Co., Ltd.) were added thereto and mixed. The raw materials of an A layer and a B layer were each charged in separate biaxial screw extruders and mixed, and the mixture melt was jointed in a feed block and then melt-extruded through a T-die at 280° C., wound around a rotating metal roll cooled at a surface temperature of 30° C. to quench, thereby obtaining an undrawn film having a thickness of 240 μm and a laminated structure of B/A/B (B/A/B=60 μm/120 μm/60 The undrawn film having a thickness of 240 μm described above was introduced to a lengthwise drawing machine in which a plurality of rolls were continuously disposed, and drawn in the lengthwise direction by utilizing the difference of rotary speed of rolls. Namely, the undrawn film was preheated on a preheating roll until the film temperature became 85° C., and then lengthwisely drawn 1.5 times by utilizing the rotary speed difference between a low-speed rotary roll whose surface temperature was set at 85° C. and a high-speed rotary roll whose surface temperature was set at 30° C.

Then, the lengthwise drawn film was heat set at temperature of 130° C. for 10 seconds by wind having wind speed of 18 m/s in a state that both edges in the width direction are held by clips in the tenter, and the film was introduced to the cooling zone, and actively cooled by blowing wind of low temperature until the surface temperature of the film became 80° C., then the film after the cooling was introduced to a transverse drawing zone, and drawn 4.0 times in the width direction (transverse direction) at 75° C.

Thereafter, the film after transverse drawing was introduced to the final heat treatment zone in the tenter, heat-treated in the final heat treatment zone at a temperature of 85° C. for 10 seconds in a state that both edges in the width direction are held by clips, and then cooled, both edge parts were cut and removed for winding a roll of width 400 mm. A biaxially drawn film of about 45 μm (thickness of skin layer/core layer/skin layer=10 μm/25 μm/10 μm) in a predetermined length was produced continuously. Then, obtained biaxially film had preferable heat shrinkage properties, preferable right-angled tear strength, lightweight property, and high whiteness, therefore it was preferable in a comprehensive manner.

Example 9

A heat-shrinkable film was continuously produced by the same method as in Example 8 except that in place of 10% by weight of a polystyrene resin added in the raw material for an A layer in Example 8, 10% by weight of a crystalline polypropylene resin (FO-50F, manufactured by Grand Polymer Co., Ltd.) was used. The properties of the film obtained were evaluated by the same method as in Example 8. The evaluation results are shown in Table 6. A good film was obtained in the same manner as in Example 8.

Example 10

A heat-shrinkable film was continuously produced by the same method as in Example 8 except that polyester 3 and polyester 2 were mixed in a weight ratio of 90:10 to obtain raw material polyesters being charged in extruders for an A layer and a B layer The properties of the film obtained were evaluated by the same method as in Example 8. The evaluation results are shown in Table 6. A good film was obtained in the same manner as in Example 8.

Example 11

A biaxially drawn film was obtained in the same manner as in Example 8 except that the thickness of the undrawn film was 180 the drawing ratio at the lengthwise drawing process was 1.1 times, and the temperature of intermediate heat treatment was changed to 125° C. The properties of the film obtained were evaluated by the same method as in Example 8. The evaluation results are shown in Table 6. The right-angle tear strength was slightly large, and the defective fraction of perforation-opening was slightly high, but it was preferable in a comprehensive manner.

Example 12

A biaxially drawn film was obtained in the same manner as in Example 8 except that the thickness of the undrawn film was 272 μm, the drawing ratio at the lengthwise drawing process was 1.7 times, and the temperature of intermediate heat treatment was changed to 140° C. The properties of the film obtained were evaluated by the same method as in Example 8. The evaluation results are shown in Table 6. The right-angle tear strength was small, and perforation-opening property was good, therefore it was extremely preferable in a comprehensive manner.

Example 13

A biaxially drawn film was obtained in the same manner as in Example 8 except that in the forced cooling process, the film surface temperature was cooled only to 90° C. The properties of the film obtained were evaluated by the same method as in Example 8. The evaluation results are shown in Table 6. Irregularity of thickness in the width direction was slightly large, but it was preferable in a comprehensive manner.

Example 14

A biaxially drawn film was obtained in the same manner as in Example 8 except that polyester 1 and polyester 2 were mixed in a weight ratio of 30:70 as raw material for a B layer in place of mixing the polyester 1 and polyester 2 in a weight ratio of 90:10. The properties of the film obtained were evaluated by the same method as in Example 8. The evaluation results are shown in Table 6. The solvent adhesive strength was small, but it was extremely preferable in a comprehensive manner.

Example 15

A biaxially drawn film of about 45 μm in a predetermined length was continuously produced by forming into a film in the same condition as in Example 8 except that the amount of titanium dioxide (TA-300 manufactured by Fuji Titanium Industry Co., Ltd.) to be added in an A layer was changed to 14% by weight. The properties of the film obtained were evaluated by the above mentioned method. The evaluation results are shown in Table 6. Whiteness was high, therefore it was preferable in a comprehensive manner.

Comparative Example 3

A transverse monoaxial drawn film of about 45 μm was obtained in the same manner as in Example 8 except that the thickness of undrawn film was 170 μm, lengthwise drawing step, intermediate heat treatment step and force cooling step were not conduct, only transverse monoaxial drawing was conduct. The properties of the film obtained were evaluated by the same method as in Example 8. The evaluation results are shown in Table 6. Since the value of MOR of this transverse monoaxial drawing film was large compared with the biaxial drawing film in Example 8, the right-angled tear strength was large, and the defective fraction of perforation-opening was high, it was not preferable.

Comparative Example 4

A biaxially drawn film was obtained in the same manner as in Example 8 except that the temperature in the intermediate heat treatment was changed 100° C. Compared with the biaxial drawing film in Example 8, this biaxial drawing film had larger hot-water shrinkage ratio, the shrinkage strain of label was remarkable, it was not preferable.

Properties and compositions of polyester raw materials used in Examples 16-21 related to the third invention and Comparative Example 5 and production conditions of films (drawing, heat treatment condition etc.) in Examples and Comparative Example are shown in Table 7 and Table 8, respectively.

TABLE 7

| | Raw material composition of polyester (mole %) | | | | |
|---|---|---|---|---|---|
| | Dicarboxylic acid component | Polyhydric alcohol component | | | |
| | DMT | EG | NPG | CHDM | BD |
| Polyester A | 100 | 100 | — | — | — |
| Polyester B | 100 | 70 | 30 | — | — |
| Polyester C | 100 | 70 | — | 30 | — |
| Polyester D | 100 | — | — | — | 100 |

TABLE 6

| | Evaluation results | | | | | | | | |
|---|---|---|---|---|---|---|---|---|---|
| | Hot-water shrinkage (%) | | | | | Solvent | Irregularity of thickness (%) | | Thickness |
| | Width direction 95° C. | Longitudinal direction 80° C. | Right-angled tear strength (N/mm) | Whiteness | Whole light transmittance (%) | adhesive strength (N/15 mm) | Width direction | Longitudinal direction | of film (μm) |
| Example 8 | 59 | 1 | 260 | 83 | 32 | 6.2 | 9.5 | 10.5 | 45 |
| Example 9 | 59 | 1 | 260 | 83 | 32 | 6.2 | 9.5 | 10.5 | 45 |
| Example 10 | 60 | 1 | 255 | 83 | 32 | 6.8 | 10.5 | 11.5 | 45 |
| Example 11 | 58 | −1 | 290 | 82 | 33 | 6.5 | 9 | 9 | 45 |
| Example 12 | 61 | 2 | 230 | 83 | 31 | 6 | 11.5 | 11 | 45 |
| Example 13 | 55 | 0.5 | 265 | 82 | 33 | 6.4 | 16.5 | 10.5 | 45 |
| Example 14 | 54 | 2 | 270 | 82 | 31.0 | 2 | 9.5 | 10.2 | 45 |
| Example 15 | 54 | 1 | 260 | 90 | 28 | 6.2 | 10.5 | 11 | 45 |
| Comparative Example 3 | 58 | 0 | 320 | 81 | 33 | 6.6 | 8 | 8 | 45 |
| Comparative Example 4 | 58 | 7 | 280 | 83 | 32 | 6.2 | 9 | 8.5 | 45 |

| | Evaluation results | | | | |
|---|---|---|---|---|---|
| | Apparent density (g/cm³) | Molecular orientation ratio(MOR) | Label adhesiveness | Shrinkage strain of label | Defective fraction of perforation opening (%) |
| Example 8 | 1.17 | 3.8 | Good | Good | 16 |
| Example 9 | 1.17 | 3.8 | Good | Good | 16 |
| Example 10 | 1.18 | 3.8 | Good | Good | 14 |
| Example 11 | 1.19 | 4.1 | Good | Good | 20 |
| Example 12 | 1.16 | 3.6 | Good | Good | 8 |
| Example 13 | 1.17 | 3.9 | Good | Good | 16 |
| Example 14 | 1.17 | 4.0 | Good | Good | 18 |
| Example 15 | 1.18 | 3.8 | Good | Good | 16 |
| Comparative Example 3 | 1.21 | 4.2 | Good | Good | 30 |
| Comparative Example 4 | 1.17 | 4.1 | Good | Poor | 16 |

TABLE 8-1

| | Layer | Resin composition | Added mount of Polystyrene (wt %) | Added mount of Polypropylene (wt %) | Added mount of Titanium dioxide (wt %) | Amorphous component (mole %) | Amorphous component of whole film (mole %) |
|---|---|---|---|---|---|---|---|
| Example. 16 | X | A/B/D = 10:80:10 | 10 | 0 | 10 | 19.2 | 21.6 |
| | Y | A/B/D = 10:80:10 | 0 | 0 | 0 | 24 | |
| Example. 17 | X | A/B/D = 10:80:10 | 0 | 10 | 10 | 19.2 | 21.6 |
| | Y | A/B/D = 10:80:10 | 0 | 0 | 0 | 24 | |
| Example. 18 | X | A/B/C/D = 10:15:65:10 | 10 | 0 | 10 | 19.2 | 21.6 |
| | Y | A/B/C/D = 10:15:65:10 | 0 | 0 | 0 | 24 | |
| Example. 19 | X | A/C/D = 10:80:10 | 10 | 0 | 10 | 19.2 | 21.6 |
| | Y | A/C/D = 10:80:10 | 0 | 0 | 0 | 24 | |
| Example. 20 | X | A/B/D = 10:80:10 | 10 | 0 | 10 | 19.2 | 21.6 |
| | Y | A/B/D = 10:80:10 | 0 | 0 | 0 | 24 | |
| Example. 21 | X | A/B/D = 10:80:10 | 10 | 0 | 14 | 18.2 | 21.1 |
| | Y | A/B/D = 10:80:10 | 0 | 0 | 0 | 24 | |
| Comparative Example 5 | X | A/B/D = 10:80:10 | 10 | 0 | 10 | 19.2 | 21.6 |
| | Y | A/B/D = 10:80:10 | 0 | 0 | 0 | 24 | |

| | Drawing condition | | | | | | | | | |
|---|---|---|---|---|---|---|---|---|---|---|
| | Lengthwise drawing | | | | Intermediate heat treatment (heat treatment after lengthwise drawing) | | | | Transverse drawing step | | |
| | First drawing step | | Second drawing | | | | | | | | Final heat treatment |
| | Temperature (°C.) | Ratio | Temperature (°C.) | Ratio | Total ratio | Temperature (°C.) | Time (sec) | Presence or absence of intermediate zone | Temperature of cooling step | Temperature (°C.) | Ratio | temperature (°C.) |
| Example. 16 | 78 | 2.6 | 95 | 1.4 | 3.64 | 160 | 5 | Presence | 100 | 95 | 4 | 85 |
| Example. 17 | 78 | 2.6 | 95 | 1.4 | 3.64 | 160 | 5 | Presence | 100 | 95 | 4 | 85 |
| Example. 18 | 78 | 2.6 | 95 | 1.4 | 3.64 | 160 | 5 | Presence | 100 | 95 | 4 | 85 |
| Example. 19 | 78 | 2.6 | 95 | 1.4 | 3.64 | 160 | 5 | Presence | 100 | 95 | 4 | 85 |
| Example. 20 | 78 | 2.9 | 95 | 1.4 | 4.06 | 170 | 8 | Presence | 100 | 95 | 4 | 85 |
| Example. 21 | 78 | 2.6 | 95 | 1.4 | 3.64 | 160 | 5 | Presence | 100 | 95 | 4 | 85 |
| Comparative Example 5 | — | — | — | — | — | — | — | Presence | — | 75 | 4 | 85 |

<Preparation of Polyester Raw Material>

Into an autoclave made of stainless steel equipped with a stirrer, a thermometer and a partial reflux condenser, 100 mol % of dimethyl terephthalate (DMT) as a dibasic acid component and 100 mol % of ethylene glycol (EG) as a glycol component were charged such that glycol became 2.2 times to methyl ester in mole ratio, and using 0.05 mol % (relative to acid component) of zinc acetate as an ester exchange catalyst, ester exchange reaction was conducted while distilling methanol generated out of the system. Thereafter, 0.025 mol % (relative to acid component) of antimony trioxide as a polycondensation catalyst was added thereto, polycondensation reaction was carried out at 280° C. under a reduced pressure of 26.6 Pa (0.2 ton). A polyester (A) of 0.70 dl/g in intrinsic viscosity was obtained. This polyester is polyethylene terephthalate. Further, in the same way as described above, polyesters (B, C, D) shown in Table 7 were synthesized. In the Table, NPG is neopentyl glycol, CHDM is 1,4-cyclohexanedimethanol, and BD is 1,4-butanediol. Regarding the intrinsic viscosity of each polyester, B was 0.72 dl/g, C was 0.80 dl/g and D was 1.15 dl/g. Each polyester was suitably made into chips.

Example 16

The above-described polyester A, polyester B and polyester D were mixed in a weight ratio of 10:80:10 to obtain a raw material for a Y layer. As a raw material for an X layer, upon mixing the polyester A, polyester B and polyester D in a weight ratio of 10:80:10 in the same manner as in the above, further, 10% by weight of a polystyrene resin (G797N, manufactured by Japan Polystyrene Inc.) and 10% by weight of titanium dioxide (TA-300, manufactured by Fuji Titanium Industry Co., Ltd.) were added thereto and mixed. The raw materials of an X layer and a Y layer were each charged in separate biaxial screw extruders and mixed, and the mixture melt was jointed in a feed block and then melt-extruded through a T-die at 280° C., wound around a rotating metal roll cooled at a surface temperature of 30° C. to quench, thereby obtaining an undrawn film having a thickness of 484 μm and a laminated structure of Y/X/Y (Y/X/Y=121 μm/242 μm/121 μm). The take-up speed (rotation speed of metal roll) of the undrawn film in this case was about 20 m/min. The Tg of the undrawn film was 67° C.

Then, the thus obtained undrawn film described above was introduced to a lengthwise drawing machine in which a plurality of rolls were continuously disposed, and drawn in the lengthwise direction in two steps by utilizing the difference of rotary speed of rolls. Namely, the undrawn film was preheated on a preheating roll until the film temperature became 78° C., and then drawn 2.6 times by utilizing the rotary speed difference between a low-speed rotary roll whose surface temperature was set at 78° C. and a medium-speed rotary roll whose surface temperature was set at 78° C. (lengthwise drawing of the first step). Furthermore, the lengthwisely drawn film was lengthwisely drawn 1.4 times by utilizing the rotary speed difference between a medium-speed rotary roll whose surface temperature was set at 95° C. and a high-speed rotary roll whose surface temperature was set at 30° C. (lengthwise drawing of the second step; accordingly, the total lengthwise drawing ratio was 3.64 times).

The film immediately after the lengthwise drawing as described above was forcedly cooled at a cooling speed of 40° C./sec by a cooling roll (high-speed roll positioned just behind the lengthwise drawing roll in the second step) whose surface temperature was set at 30° C., and then the film after cooling was introduced to a tenter, and continuously passed through an intermediate heat treatment zone, a first intermediate zone (natural cooling zone), a cooling zone (forced cooling zone), a second intermediate zone, a transverse drawing zone and a final heat treatment zone. In the tenter, the length of the first intermediate zone was set to about 40 cm, and shielding plates were each provided between the intermediate heat treatment zone and the first intermediate zone; between the first intermediate zone and the cooling zone; between the cooling zone and the second intermediate zone; and between the second intermediate zone and the transverse drawing zone. Furthermore, in the first intermediate zone and the second intermediate zone, hot wind from the intermediate heat treatment zone, cooling wind from the cooling zone and hot wind from the transverse drawing zone were shut off such that when a rectangular strip of paper is hung down in the vertical direction in a state that a film is not passed through, the strip of paper hangs down almost completely in the vertical direction. In addition, when a film passes through, the distance of the film and the shielding plate was adjusted such that the most part of associated air accompanied by movement of the film was shut off by the shielding plate provided between the intermediate heat treatment zone and the first intermediate zone. In addition, when a film passes through, in the boundary between the intermediate heat treatment zone and the first intermediate zone, and the boundary between the cooling zone and the second intermediate zone, the distance of the film and the shielding plate was adjusted such that the most part of associated air accompanied by movement of the film was shut off by the shielding plate.

Then, the lengthwisely drawn film introduced to the tenter was heat-treated at first in the intermediate heat treatment zone at a temperature of 160° C. for 5.0 seconds, and then the film after the intermediate heat treatment was introduced to the first intermediate zone, and subjected to natural cooling by passing it through the zone (passing time=about 1.0 second). Thereafter, the film after the natural cooling was introduced to the cooling zone, and actively cooled by blowing wind of low temperature until the surface temperature of the film became 100° C., the film after the cooling was introduced to the second intermediate zone, and subjected to natural cooling again by passing it through the zone (passing time=about 1.0 second). Further, the film after passing through the second intermediate zone was introduced to the transverse drawing zone, preheated until the surface temperature of the film became 95° C., and drawn 4.0 times in the width direction (transverse direction) at 95° C.

Thereafter, the film after the transverse drawing was introduced to the final heat treatment zone, heat-treated in the final heat treatment zone at a temperature of 85° C. for 5.0 seconds, and then cooled, both edge parts were cut and removed for winding a roll of width 500 mm. A biaxially drawn film of about 40 μm in a predetermined length was produced continuously. Then, properties of the film and label obtained were evaluated by the foregoing methods. The evaluation results are shown in Table 9.

Example 17

A heat-shrinkable white film was continuously produced by the same method as in Example 16 except that in place of 10% by weight of a polystyrene resin added in the raw material for an X layer in Example 16, 10% by weight of a crystalline polypropylene resin (FO-50F manufactured by Grand Polymer Co., Ltd.) was used. The properties of the film and label obtained were evaluated by the same method as in Example 16. The evaluation results are shown in Table 9. It was a good film like the film of Example 16.

Example 18

The above-described polyester A, polyester B, polyester C and polyester D were mixed in a weight ratio of 10:15: 65:10 to obtain raw material polyesters for an X layer and a Y layer, and each was charged in an extruder. Upon mixing, only to the raw material for an X layer, in the same manner as in Example 16, 10% by weight of a polystyrene resin (G797N, manufactured by Japan Polystyrene Inc.) and 10% by weight of titanium dioxide (TA-300, manufactured by Fuji Titanium Industry Co., Ltd.) were added. Thereafter, each mixed resin was melt-extruded in the same condition as in Example 16 to form an undrawn film. The Tg of the undrawn film was 67° C. The undrawn film was formed into a film in the same condition as in Example 16, thereby continuously producing a biaxially drawn film of about 40 μM in 500 mm width. The properties of the film and label obtained were evaluated by the same method as in Example 16. The evaluation results are shown in Table 9.

Example 19

The above-described polyester A, polyester C and polyester D were mixed in a weight ratio of 10:80:10 to obtain raw material polyesters for an X layer and a Y layer, and each was charged in an extruder. Upon mixing, only to the raw material for an X layer, in the same manner as in Example 16, 10% by weight of a polystyrene resin (G797N, manufactured by Japan Polystyrene Inc.) and 10% by weight of titanium dioxide (TA-300, manufactured by Fuji Titanium Industry Co., Ltd.) were added. Thereafter, each mixed resin was melt-extruded in the same condition as in Example 16 to form an undrawn film. The undrawn film was formed into a film in the same condition as in Example 16, thereby continuously producing a biaxially drawn film of about 40 μm in 500 mm width. The properties of the film and label obtained were evaluated by the same method as in Example 16. The evaluation results are shown in Table 9.

Example 20

An undrawn film having a laminated structure of Y/X/Y was obtained in the same manner as in Example 16 except that film thickness was changed to 532 μm (Y/X/Y=133 μm/266 μm/133 μm) by adjusting the discharge amount. A biaxially drawn film of about 40 μm in 500 mm wide was continuously produced by film-forming the undrawn film in the same manner in Example 16 except that the lengthwise drawing ratio of the first step was 2.9 times, total lengthwise drawing ratio was 4.06 times, and heat treatment was conducted at 170° C. for 8.0 seconds in the intermediate heat treatment zone. Then, properties of the film and label obtained were evaluated by the same way as in Example 16. The evaluation results are shown in Table 9.

Example 21

A biaxially drawn film of about 40 μm was continuously produced in 500 mm width by forming into a film in the same condition as in Example 16 except that the amount of titanium dioxide (TA-300 manufactured by Fuji Titanium Industry Co., Ltd.) to be added in an X layer in Example 16 was changed to 14% by weight. The properties of the film and label obtained were evaluated by the same method as in Example 16. The evaluation results are shown in Table 9.

Comparative example 5

Upon melt-extruding the same polyester raw material of Example 16 in the same manner as in Example 16, the discharge amount of an extruder was adjusted so as to be an undrawn film having a thickness of 144 μm and a laminated structure of Y/X/Y (Y/X/Y=36 μm/72 μm/36 μm). Except those described above, an undrawn film was obtained in the same manner as in Example 16. The undrawn film was not drawn in the longitudinal direction, after raising the film temperature to 90° C., the undrawn film was drawn at 75° C. by 4 times in the film width direction, thereby to continuously produce a mono-axial drawn film of about 40 μm in 500 mm width. The properties of the film and label obtained were evaluated by the same way as in Example 16. The evaluation results are shown in Table 9.

erated in the film roll. Regarding the package covered with the label composed of the heat-shrinkable white polyester film obtained in each Example, light shielding was sufficient, perforation opening property of the label was all good, and the label was able to be torn finely by an appropriate force along the perforation.

In contrast to that, regarding the package covered with the label composed of the heat-shrinkable polyester film obtained in Comparative Example 5, perforation opening property of the label was not good, and the label was not able to be torn finely by an appropriate force along the perforation in a high rate.

INDUSTRIAL APPLICABILITY

The heat-shrinkable white polyester film of the present invention has excellent properties such as easy cut of perforation, a light shielding property and a lightweight property, thus it can be used suitably in label applications of a bottle, and a package such as a bottle which was obtained by using the film as a label is provided with a beautiful appearance in addition to easy cut of perforation and a light shielding property brought from the label.

TABLE 9

Properties of heat-shrinkable white film

| | Hot-water shrinkage (%) | | | Tensile breaking | Solvent | | |
|---|---|---|---|---|---|---|---|
| | Width direction | | Longitudinal direction | Right-angled tear strength | strength (MPa) Orthogonal | adhesive strength | Dynamic friction | Apparent density |
| | 80° C. | 90° C. | 90° C. | (N/mm) | direction | (N/15 mm) | coefficient | (g/cm$^3$) |
| Example 16 | 45 | 54 | 2 | 140 | 210 | 5.2 | 0.47 | 1.10 |
| Example 17 | 44 | 55 | 2 | 150 | 220 | 5 | 0.43 | 1.10 |
| Example 18 | 43 | 54 | 2 | 150 | 215 | 5.9 | 0.41 | 1.11 |
| Example 19 | 44 | 54 | 1.5 | 150 | 210 | 6.6 | 0.41 | 1.12 |
| Example 20 | 43 | 54 | 2 | 110 | 240 | 4.4 | 0.43 | 1.08 |
| Example 21 | 41 | 50 | 2 | 135 | 190 | 5.2 | 0.47 | 1.11 |
| Comparative Example 5 | 45 | 53 | 1 | 320 | 60 | 6 | 0.52 | 1.20 |

Properties of label

| | Right-angled tear strength (N/mm) | Tensile breaking strength (MPa) Orthogonal direction | Whiteness | Whole light transmittance (%) | Apparent density (g/cm$^3$) | Label adhesiveness | Irregularity of shrinkage | Defective fraction of perforation opening (%) |
|---|---|---|---|---|---|---|---|---|
| Example 16 | 130 | 210 | 88 | 27 | 1.14 | Good | Good | 2 |
| Example 17 | 140 | 210 | 88 | 28 | 1.14 | Good | Good | 2 |
| Example 18 | 140 | 200 | 88 | 27 | 1.15 | Good | Good | 2 |
| Example 19 | 150 | 195 | 88 | 27 | 1.16 | Good | Good | 2 |
| Example 20 | 100 | 230 | 89 | 26 | 1.12 | Good | Good | 4 |
| Example 21 | 130 | 175 | 92 | 24 | 1.15 | Good | Good | 4 |
| Comparative Example 5 | 310 | 45 | 84 | 32 | 1.24 | Good | Good | 30 |

As is clear from Table 9, all the films obtained in Examples 16 to 21 had a high shrinkage in the width direction being the main shrinkage direction, and a very low shrinkage in the longitudinal direction orthogonal to the main shrinkage direction. All the films obtained in Examples 16 to 21 were lightweight, and for all the films, light shielding was sufficient, solvent adhesive strength was high, label adhesiveness was good, there was no irregularity of shrinkage, and shrinkage finish property was good. Further, for the heat-shrinkable white polyester films obtained in Examples 16 to 21, perforation-opening property was good, and no wrinkle was gen-

EXPLANATION OF REFERENCE NUMERAL

F Film

Figure 1:
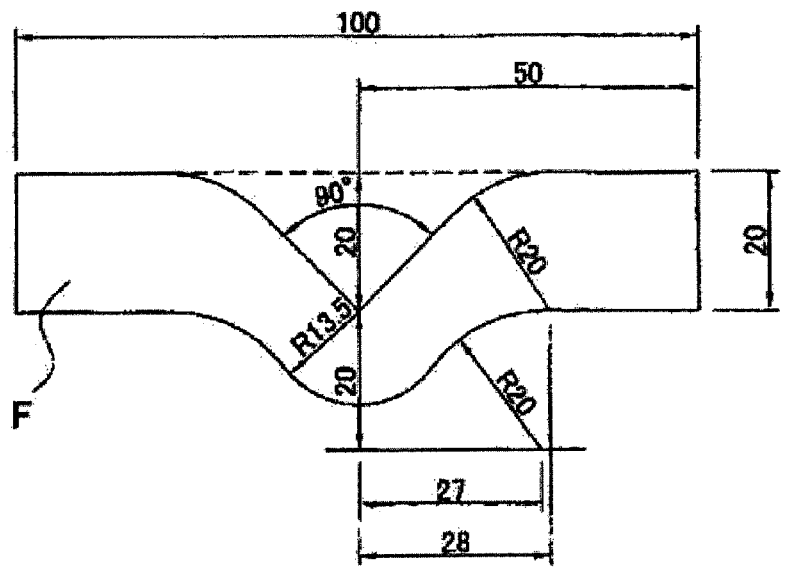
FIG. 1 is an explanatory drawing showing a shape of specimen in measurement of right-angled tear strength of a film (additionally, unit in length of each part of specimen in the figure is mm).
Figure 2:
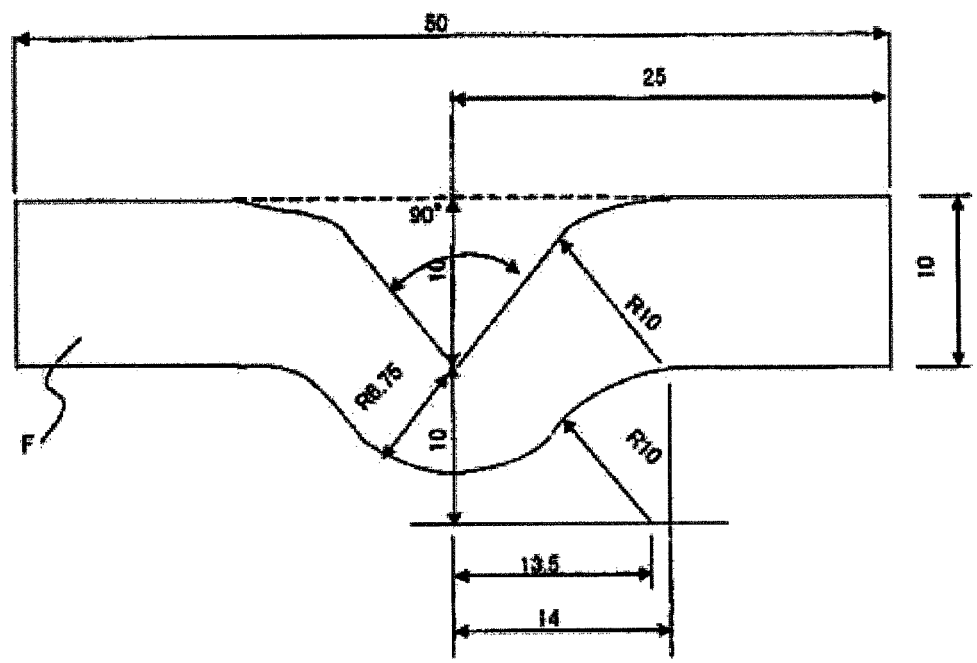
FIG. 2 is an explanatory drawing showing a shape of specimen in measurement of right-angled tear strength of a label (additionally, unit in length of each part of specimen in the figure is mm).

The invention claimed is:

1. A label comprising a heat-shrinkable white film as a base material thermally shrinking in the film width direction as the main shrinkage direction, being cut according to an object to be packaged, and bonded at both edges in the film width direction, the tubular body being thermally shrunk so that at least part of the periphery of the object to be packaged is covered with the label, wherein
   (a) whiteness is 70 or more, or/and voids are contained, the film has a molecular orientation ratio of 3.5 or more and 4.1 or less,
   (b) a right-angle tear strength in the direction orthogonal to the main shrinkage direction (film longitudinal direction) is 90 N/mm to 300 N/mm, and
   (c) a tensile break strength in the direction orthogonal to the main shrinkage direction (film longitudinal direction) is 50 MPa or more and 250 MPa or less.

2. The label of claim 1, wherein bonding is conducted with an organic solvent.

3. The label of claim 1, wherein a perforation or a notch is provided along the direction orthogonal to the main shrinkage direction (film longitudinal direction).

4. The label of claim 1, wherein the heat-shrinkable white film is a heat-shrinkable white polyester film.

5. The label of claim 1, wherein an apparent density is 1.20 g/cm$^3$ or less.

* * * * *